United States Patent [19]

Peterson et al.

[11] Patent Number: 5,168,499
[45] Date of Patent: Dec. 1, 1992

[54] FAULT DETECTION AND BYPASS IN A SEQUENCE INFORMATION SIGNAL PROCESSOR

[75] Inventors: John C. Peterson, Alta Loma; Edward T. Chow, San Dimas, both of Calif.

[73] Assignee: California Institute of Technology, Pasadena, Calif.

[21] Appl. No.: 591,990

[22] Filed: Oct. 2, 1990

Related U.S. Application Data

[63] Continuation-in-part of Ser. No. 518,562, May 2, 1990.

[51] Int. Cl.$^5$ ............................................. G01R 31/28
[52] U.S. Cl. .................................... 371/11.3; 371/22.3
[58] Field of Search ............................. 371/22.3, 11.3; 395/575

[56] References Cited

U.S. PATENT DOCUMENTS

| | | |
|---|---|---|
| 3,649,963 | 3/1972 | Holm et al. |
| 3,898,621 | 8/1975 | Zelinski et al. |
| 4,039,813 | 8/1977 | Kregness. |
| 4,233,682 | 11/1980 | Liebergot et al. |
| 4,242,751 | 12/1980 | Henckels et al. |
| 4,347,608 | 8/1982 | Appiano et al. |
| 4,358,823 | 11/1982 | McDonald et al. |
| 4,675,646 | 6/1987 | Lauer. |
| 4,710,932 | 12/1987 | Hiroshi. |
| 4,726,024 | 2/1988 | Guziak et al. |
| 4,730,319 | 3/1988 | David et al. |
| 4,745,542 | 5/1988 | Baba et al. |
| 4,757,503 | 7/1988 | Hayes et al. |
| 4,768,196 | 8/1988 | Jou et al. |
| 4,821,176 | 4/1989 | Ward et al. |
| 4,837,765 | 6/1989 | Suzuki. |
| 4,839,897 | 6/1989 | Aoki. |
| 4,849,979 | 7/1989 | Maccianti et al. |
| 4,916,695 | 4/1990 | Ossfeldt. |
| 5,032,783 | 7/1991 | Hwang et al. ................... 371/22.3 |

OTHER PUBLICATIONS

"A General Method Applicable to the Search for Similarities in the Amino Acid Sequence of Two Proteins" by S. B. Needleman and C. D. Wunsch, Journal of Molecular Biology, vol. 48, p. 444, 1970.

"Mathematical Methods for DNA Sequences" (and Chapter 3 entitled Sequence Alignments), University of Southern California by Michael S. Waterman.

"Identification of Common Molecular Subsequences" by Michael S. Waterman and T. F. Smith, Journal of Molecular Biology, vol. 147, pp. 195–197, 1981.

"A New Algorithm for Best Subsequence Alignments with Application to tRNA-rRNA Comparisons" by Michael S. Waterman and Mark Eggert, Journal of Molecular Biology, vol. 197, pp. 723–728, 1987.

*Primary Examiner*—Vincent P. Canney
*Attorney, Agent, or Firm*—Leonard Tachner

[57] ABSTRACT

The invention comprises a plurality of scan registers, each such register respectively associated with a processor element; an on-chip comparator, encoder and fault bypass register. Each scan register generates a unitary signal the logic state of which depends on the correctness of the input from the previous processor in the systolic array. These unitary signals are input to a common comparator which generates an output indicating whether or not an error has occurred. These unitary signals are also input to an encoder which identifies the location of any fault detected so that an appropriate multiplexer can be switched to bypass the faulty processor element. Input scan data can be readily programmed to fully exercise all of the processor elements so that no fault can remain undetected.

12 Claims, 24 Drawing Sheets

FAULT DETECTION AND BYPASS IN A SEQUENCE INFORMATION SIGNAL PROCESSOR

ORIGIN OF INVENTION

The invention described herein was made in the performance of work under the following contracts: NASA contract NAS7-918; and is subject to the provisions of Public Law 96-517 (35 USC 202) in which the Contractor has elected to retain title.

CROSS-RELATED APPLICATIONS

This application is a continuation-in-part of U.S. patent application Ser. No. 07/518,562 filed May 2, 1990.

TECHNICAL FIELD

The present invention relates generally to an integrated circuit developed primarily in support of the human genome effort which is a molecular genetic analysis for mapping and sequencing the human genome. The present invention relates more specifically to a fault detection and bypass circuit in an integrated circuit co-processor which may be used for carrying out an algorithm for identifying maximally similar sequences or subsequences and for locating highly similar segments of such sequences or subsequences.

BACKGROUND ART

Release 63.0 of the national nucleic acid data base, Genbank, contains over forty million nucleotides representing about thirty-three thousand separate entries. Similarly, the current protein information resource (PIR) has close to six thousand entries with over one and one-half million amino acids. These data reflect primarily the efforts of the molecular biology community over the last decade. The rate at which new data are being added to this total demonstrates that the available computing resources are already inadequate for thorough and timely analysis of the data. Recently, an international commitment has been made to map and sequence the entire human genome in the next 10 to 20 years. Such a program will generate at least 3.4 billion nucleotides of final data and maybe ten times that amount of raw sequencing data. This constitutes about three orders of magnitude more data than has been collected to date. In addition, the sequences from other animal and plant genomes will also accumulate. In the near term, the 40 million nucleotides currently available and already proving burdensome, will become trivial by comparison to the total. Novel computer resources must be developed if these data are to be adequately understood and their unique potential for enhancing our understanding of human genetics and diseases are to be realized.

A required adjunct to any program designed to characterize the human genome is the development of computer hardware and software systems capable of maintaining and analyzing the vast amounts of information that will be generated. This information will consist of both nucleotide and amino acid sequence data as well as extensive annotation necessary to provide a biological context for these data. It is critical for the complete and timely analysis of new sequence data, that they be thoroughly compared to the published data contained in the national data libraries. This analysis is important for determining and defining the functional and evolutionary relationships between sequences. Significantly, such sequence comparison is also critical to the task of constructing the complete genome sequence from millions of partially overlapping fragments, the so-called melding process. The computational load of this melding process will grow not only at the national level of coordinating the efforts of many researchers, but also at the level of individual laboratories that must deal with the increasing load of raw data generated by the development of automated sequencing technologies.

The ability of individual investigators to analyze their own data is limited by the power of the computers they have available, as well as the limited software tools capable of dealing with the entire sequence library. The amount of total sequence data generated to date is still less than 50 million character equivalents. However, this amount of data already taxes the ability of currently available algorithms and general use computers to conduct the needed comparative analysis of new data to the collected total. The data libraries have been doubling in size every year. The program that is envisioned to characterize complete genomes, will soon cause the data libraries to increase exponentially. Such programs will also change the basic nature of the collected data and consequently the requirements for effective tools for its analysis.

In the latest Genbank release, the average length of an individual entry can span over one million bases. Many of the current methods of analyzing this data are based on the notion that each entry represents a discrete genetic element. However, this scenario does not adequately represent the more diffuse and complex organization of a eukaryotic genome, where the coding and regulatory elements of a simple gene can span more than one million bases. More complex loci, such as those coding for the rearranging receptors of the immune system, can span over one million bases and include hundreds or thousands of identifiably related elements. As more and larger sequencing efforts are undertaken, the complexity of information contained in single entries will require a novel set of maintenance and analytical tools.

The human beta globin locus is a good example. Its entry in Genbank is over 73 thousand bases long and has been constructed from over 70 overlapping contributions. This single entry contains the coding and regulatory information for at least 4 genes and 1 pseudogene. The repetitive nature of much of the genome will also severely complicate the alignment and melding problems. With megabase sequencing projects, the current concept of data entry will become obsolete. Not only will faster algorithms to compare sequences be needed as the amount of data increases, but these new tools will also have to be designed to better deal with longer strings of data that more directly reflect true genomic organization. Accordingly, novel schemes to handle and define these data and the biological information associated with them must be developed if this resource is to be useful to the scientific community.

Of the many pressing and analytical needs concerning the current sequence data libraries, as well as the genome project, initially the most significant is the ability to survey the existing collection of data for sequences related to the new data. In its simplest form, this need is illustrated by searching the collection of gene or protein sequences for any that are "similar" to a discrete piece of new data. The comparative analyses possible between related sequences are critical for completely understanding the structural, functional and evolutionary characteristics of any sequence. Furthermore, in the case where large portions of the human genome are known, it will also be necessary to have the ability to find the precise genetic location of physiological markers in those cases where there may be only limited CDNA or protein sequence data available.

Such searches are complicated by the fact that related sequences may be quite divergent. This means that it is essential to define some measure of similarity between pairs of sequences that can then be tested statistically. The explicit series of minimal evolutionary events (substitutions, deletions, insertions) between two sequences must be determined; i.e., the sequences must be aligned. Traditionally, the most common method of alignment has been by eye, relying on the researcher's ability to recognize conserved patterns. This method can be rapid and effective when the sequence distance is relatively small and/or the researcher has a priori information about the probable nature of the alignment. For example, many new members of the immunoglobulin gene superfamily have been identified and aligned to other members on the basis of a very limited, but well-defined set of conserved features. However, it is certainly no longer possible for any investigator to reliably compare a novel sequence against a significant portion of the existent data base.

It is possible in theory to generate every possible combination of genetic events between two sequences, score each one and discover the most similar. This is in practice, impossible for all but the shortest sequences however, as the combinations increase exponentially with the length of the sequences. Some investigators have implemented rule-based methods by which, given a reasonable starting alignment point, gaps and insertions are included according to a very restricted set of possibilities. These methods can be relatively rapid, but, like manual alignment, are non-rigorous methods as they cannot predictably guarantee that the results represent the optimal minimum distance, that is, the minimum evolutionary distance between two sequences or the series of events that provides the smallest weighted sum required to transform one sequence into the other.

When the assumption is that two sequences are generally similar along their entire length, the alignment process is considered to be global in nature. However, an alignment proceeding from this premise can fail to recognize more limited regions of similarity between two otherwise unrelated sequences. What is required then is the ability to find all regions of local alignment. For example, if an investigator has a new sequence related to a human beta globin gene, such as one from another species, the need is to be able to find the local alignment of that more limited sequence to some particular portion of the 73 thousand base of the known beta globin locus. The same concerns are manifest in the melding problem. By definition, most overlapping sequences will only share a limited region of identity, illustrating a local alignment problem.

In 1970, S. B. Needleman and C. D. Wunsch authored a paper entitled "A General Method Applicable To The Search For Similarities In The Amino Acid Sequence Of Two Proteins", which was published in the Journal of Molecular Biology, Volume 48, Page 444. Their paper has had a great deal of influence in biological sequence alignment. Its particular advantage is that an explicit criterion for optimality of alignment is stated and an efficient method of solution is given. Insertions, deletions and mismatches were allowed in the alignments. The method of Needleman and Wunsch fit into a broad class of algorithms, commonly referred to as dynamic programming. The general category of dynamic programming alignment of two sequences is discussed at length in a text entitled "Mathematical Methods for DNA Sequences" and particularly Chapter 3 thereof, entitled "Sequence Alignments" written by Michael S. Waterman, of the University of Southern California.

In 1980, Dr. Waterman, then with the Los Alamos Scientific Laboratory, collaborated with T. F. Smith, then a Professor at Northern Michigan University, in publishing a letter entitled "Identification of Common Molecular Subsequences" which appeared in the Journal of Molecular Biology, Volume 147, pages 195–197, 1981. In this letter, Waterman and Smith defined a new algorithm, the intention of which was to find a pair of segments, one from each of two long sequences, such that there was no other pair of segments with greater similarity (or "homology"). The algorithm produced a similarity measure which allowed for arbitrary length, deletions and insertions.

In a more recent publication, entitled "A New Algorithm for Best Subsequence Alignments With Application to tRNA-rRNA Comparisons", Waterman and Mark Eggert, in the Journal of Molecular Biology, Volume 197, pages 723–728, (1987), describe the efficiency of the algorithm of Smith and Waterman for identification of maximally similar subsequences. The article describes the use of the algorithm in which alignments of interest are produced first for the best alignment and then making small modifications to the matrix for producing non-intersecting subsequent alignments. The algorithm is applied to comparisons of tRNA-rRNA sequences from escherichia coli. A statistical analysis therein shows results which differ substantially from the results of an earlier analysis by others and furthermore, that the algorithm is much simpler and more efficient than those previously in use.

The need for low cost, high speed data sequence comparisons cannot be met even with current supercomputers because of existing data base size. There is therefore an existing need to provide an electronic circuit device for carrying out subsequence alignments of molecular sequences or global alignment thereof and more specifically for a sequence information signal processor designed to carry out a dynamic programming algorithm which is both effective and efficient in identifying subsequence or global alignments of molecular information. Such an electronic circuit device, to be reliable, should have the capability to quickly and efficiently detect hardware faults and thereafter automatically bypass such faults so that the aforementioned alignments can continue in an accurate and reliable manner despite such faults.

The following U.S. Pat. Nos. are relevant to fault detection and bypass.

U.S. Pat. No. 3,649,963 Holm et al
U.S. Pat. No. 3,898,621 Zelinski et al
U.S. Pat. No. 4,039,813 Kregness
U.S. Pat. No. 4,233,682 Liebergot et al
U.S. Pat. No. 4,242,751 Henckels et al
U.S. Pat. No. 4,347,608 Appiano et al
U.S. Pat. No. 4,358,823 McDonald et al
U.S. Pat. No. 4,675,646 Lauer
U.S. Pat. No. 4,710,932 Hiroshi
U.S. Pat. No. 4,726,024 Guziak et al U.S. Pat. No. 4,730,319 David et al
U.S. Pat. No. 4,745,542 Baba et al
U.S. Pat. No. 4,757,503 Hayes et al
U.S. Pat. No. 4,768,196 Jou et al
U.S. Pat. No. 4,821,176 Ward et al
U.S. Pat. No. 4,837,765 Suzuki
U.S. Pat. No. 4,839,897 Aoki
U.S. Pat. No. 4,849,979 Maccianti et al
U.S. Pat. No. 4,916,695 Ossfeldt U.S. Pat. No. 4,849,979 to Maccianti et al is directed to a fault tolerant computer architecture. The multiprocessor system is constructed from functional units which are duplicated and where the input and output signals are compared with each other, non-agreement resulting in an error signal.

U.S Pat. No. 4,745,542 to Baba et al is directed to a fail-safe control circuit. The controlled unit is intended to operate only when all control units provide an identical input. The AND gate is coupled to each of the operation control units for comparing the outputs therefrom.

U.S. Pat. No. 4,039,813 to Kregness is directed to a self-test monitor and diagnostic system. The system includes a memory sequentially addressed by a counter for generating stored diagnostic code words.

U.S. Pat. No. 4,710,932 to Hiroshi is directed to a fault detection system. The signal generator provides sequential test signals to both the tested circuit and a delay circuit, as similarly does the signal generator, supplying test signals to the reference circuit and similar delay circuits. The output from each test set-up is compared by the comparator for determining whether the circuit under test provides identical outputs to that of the referenced circuit.

U.S. Pat. No. 4,358,823 to McDonald et al is directed to a double-redundant processor having fault detection Each of the processors includes sub-processors which simultaneously execute the same data, control and address signals, and thus should produce the same output signals. The output from each of the sub-processors are compared by a comparator whose output is utilized to trigger an alarm monitor if agreement is not provided by the outputs of the sub-processors.

U.S. Pat. No. 4,837,765 to Suzuki is directed to a test control circuit for integrated circuits. Referring to the embodiment of FIG. 3, there is shown AND gates provided for comparing test signals provided by the selector circuits.

U.S. Pat. No. 4,726,024 to Guziak et al is directed to a failsafe architecture for a computer system. The system periodically actuates a self-check module for testing the microprocessor.

U.S. Pat. No. 4,233,682 to Liebergot et al is directed to a fault detection and isolation system. A single integrated circuit chip includes duplicate functional logic chains, each receiving input signals in parallel, and whose outputs are compared by a comparator for indicating an error condition in one of the functional circuits.

SUMMARY OF THE INVENTION

The present invention is disclosed herein for use in a sequence information signal processing integrated circuit chip designed to perform high speed calculation of a dynamic programming algorithm based upon Waterman and Smith. The signal processing chip is designed to be a building block of a linear systolic array, the performance of which can be increased by connecting additional sequence information signal processing chips to the array. The chip provides a high speed, low cost linear array processor that can locate highly similar segments or contiguous subsequences from any two data character streams (sequences) such as different DNA or protein sequences. The chip is implemented in a preferred embodiment using CMOS VLSI technology to provide the equivalent of about 400,000 transistors or 100,000 gates. Each chip provides 16 processing elements, operating at a 12.5 MHz clock frequency. The chip is designed to provide 16 bit, two's compliment operation for maximum score precision of between $-32,768$ and $+32,767$. It is designed to provide a comparison between sequences as long as 4,194,304 elements without external software and between sequences of unlimited numbers of elements with the aid of external software.

The sequence information signal processor chip permits local and global similarity searches, that is subsequence and full sequence alignment. It provides user definable gaps/insertion penalties; user definable similarity table contents; user definable threshold values for score reporting; user definable character set of up to 128 characters; user definable sequence control characters for streamline data base processing; variable block size for low or high resolution similarity searches; makes possible unlimited sequence length and numbers of blocks; on-chip block maximum score calculation; and on-chip maximum score buffer to relieve control processor data collection. It provides linear speedup by being configured for cascading more such chips and it provides threshold control with boundary score reset. The chip also provides for programmable data base operation support; block maximum value and location calculation and buffering; user-definable query threshold and preload threshold and built-in self test and fault bypass. It is the built-in self test and fault bypass feature of the signal processor chip which constitutes the present invention.

It will be seen hereinafter that each of sixteen processor elements on a sequence information signal processing integrated circuit chip, provides the circuitry to compare the sequence characters of a matrix H, based upon a novel modification of the Smith and Waterman Algorithm for two sequences. Circuitry is also provided for defining the degrees of similarity of two sequences so that different linear deletion functions can be defined for each of the two sequences and different similarity weights can be defined for each character of the query sequence.

The specific invention disclosed herein relates to a fault detection and bypass circuit which has been employed in the aforementioned integrated circuit chip. While this inventive circuit would be applicable and highly advantageous in systolic array processors in general, it is especially useful in the disclosed integrated circuit chip. The invention's particular significance in the chip disclosed herein, relates to the advantage of fault detection and bypass which occurs automatically and thus assures accurate sequence and subsequence alignment even where the probability of a hardware fault is significant. The probability of a fault occurring in one or more transistors in a chip having sixteen processors and on a printed circuit board having, for example, thirty five such chips, is mathematically non-trivial. By way of example, the typical failure rate of a processor of the type disclosed herein is one failure in each million hours of operating time. Given a typical system of four such boards and approximately 2,000 such processors, a failure in a processor can be expected statistically about every twenty days of continuous operation. The fault detection and bypass function of the present invention is thus, statistically, an important reliability feature of the disclosed integrated circuit chip.

The invention comprises a plurality of scan registers, each such register respectively associated with a processor element; an on-chip comparator, encoder and fault bypass register. Each scan register generates a unitary signal the logic state of which depends on the correctness of the input from the previous processor in the systolic array. These unitary signals are input to a common comparator which generates an output indicating whether or not an error has occurred. These unitary signals are also input to an encoder which identifies the location of any fault detected so that an appropriate multiplexer can be switched to bypass the faulty processor element. Input scan data can be readily programmed to fully exercise all of the processor elements so that no fault can remain undetected. The pipeline data configuration of the processor elements, when combined with single clock compare functions, provides an extremely fast and highly efficient fault detection capability for use in systolic arrays. The fault bypass capability assures accurate and reliable signal processing even where there is a high probability of a fault occurring. Furthermore, because of the unique parallel testing scheme of the present invention, complete testing procedure may be carried out in about 1.8 seconds. On the other hand, if each processor of a 2,000 processor array were tested individually, it could take as long as $2,000 \times 1.8$ seconds or one hour to carry out the same degree of testing.

OBJECTS OF THE INVENTION

It is therefore a principal object of the present invention to provide a novel fault detection and bypass circuit for use in conjunction with large systolic arrays of processor elements.

It is an additional object of the present invention to provide a highly efficient fault detection capability in a sequence information signal processing system on a single integrated circuit chip.

It is still an additional object of the present invention to provide a fault detection and bypass circuit in an integrated circuit chip having highly integrated VLSI technology for ascertaining the similarity between two segments of two different DNA or protein sequences by performing a best subsequence alignment algorithm.

It is still an additional object of the present invention to provide in an integrated circuit chip having a plurality of processors thereon, each such processor being designed to carry out an algorithm for providing scoring of the relative alignments of sequence segments for the comparison of multiple sequences of data and the chip having a fault detection and bypass circuit which assures high reliability in accurately carrying out such an algorithm.

BRIEF DESCRIPTION OF THE DRAWINGS

The aforementioned objects and advantages, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

The information signal processor integrated circuit chip of the present invention is designed to compare two sequences, such as two molecular sequences, and to determine their similarity by ascertaining the best score of any alignment between such sequences. A preferred embodiment of the invention illustrated herein is designed to perform this sequence comparison by carrying out the previously identified Smith and Waterman algorithm. Accordingly, the method and apparatus of the present invention may be best understood by first understanding the algorithm on which it is based and which comprises the following:

For two sequences $A = a_1 a_2 \ldots a_n$ and $B = b_1 b_2 \ldots b_m$, the best (largest) score from aligning A and B is $S(A,B)$.

$H_{i,j}$ is defined as the best score of any alignment ending at $a_i$ and $b_j$ or 0. So, $$H_{i,j} = \max\{0; S(a_x a_{x+1} \ldots a_i, b_y b_{y+1} \ldots b_j): 1 \leq x \leq i, 1 \leq y \leq j\}.$$

The similarity measure between sequence letters a and b is $s(a,b)$ where, $s(a,b) > 0$ if $a = b$ $s(a,b) < 0$ for at least some cases of a not equal to b.

The similarity algorithm is started with:

$$H_{i,0} = H_{0,j} = 0, \ 1 \leq i \leq n, \ 1 \leq j \leq m.$$

Then:

$$H_{i,j} = \max\{0, H_{i-1,j-1} + s(a_i, b_j), E_{i,j}, F_{i,j}\}$$

where:

$$E_{i,j} = \max\{H_{i,j-1} - (u_E + v_E), E_{i,j-1} - v_E\}$$

$$F_{i,j} = \max\{H_{i-1,j} - (u_F + v_F), F_{i-1,j} - v_F\}$$

From the above, it will be seen that each processor for determining the best score $H_{i,j}$ of an alignment ending at $a_i$ and $b_j$ must provide parameters for the calculation of $H_{i+1,j}$, $H_{i,j+1}$; and $H_{i+1,j+1}$. This requirement for generating parameters for subsequent best score calculation processes may be better understood by reference to FIG. 1, which for purposes of example, illustrates a four-by-four matrix of calculations for $n = 4$ and $m = 4$. It will be seen in FIG. 1 that each alignment comparison process is represented by a circle having within it elements of the two sequences, A and B, at which the respective alignments are being scored. It will also be seen in FIG. 1, that parameters are passed either from left to right or from top to bottom or diagonally from upper left to lower right from each alignment process circle to the others in the matrix in order to carry out the algorithm of the present invention. Thus for example, it will be seen in FIG. 1, that the best score for the alignment ending at $a_2$ and $b_2$, receives the parameter $H_{1,1}$ from the $a_1,b_1$ comparison process; receives $H_{1,2}$ and $F_{1,2}$ from the $a_1,b_2$ comparison process; and receives the $H_{2,1}$ and $E_{2,1}$ parameters from the $a_2,b_1$ process. All of these parameters are, in accordance with the Waterman and Smith algorithm, required to generate $H_{2,2}$ which is defined as the best score of the alignment of the A and B sequences ending at $a_2$ and $b_2$.

Figure 1:
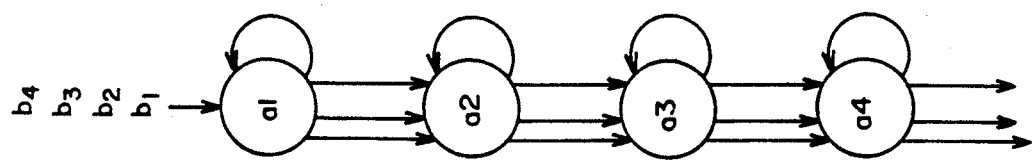
FIG. 1 is a graphical illustration of the matrix elements of the algorithm of the signal processor hereof and illustrating a projection technique for reducing the number of real time processors for carrying out the algorithm.
Figure 1:
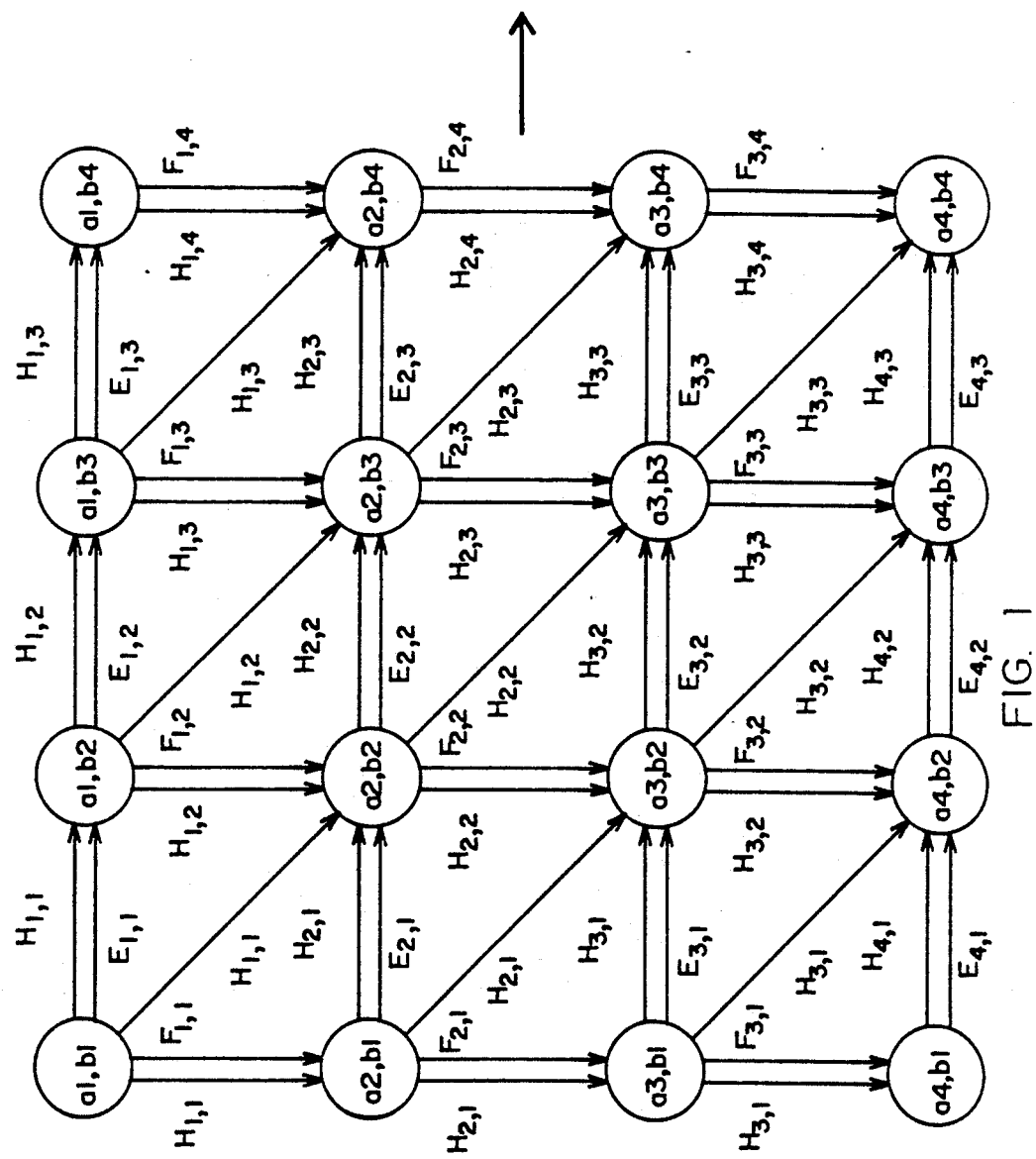

It will also be seen in FIG. 1, that as a result of the computation carried out by the process at $a_2,b_2$ parameters $H_{2,2}$, $E_{2,2}$ and $F_{2,2}$, all resulting from the best score alignment computation at $a_2,b_2$ are transferred as required to each of the three subsequent comparisons $a_2,b_3,a_3,b_2$ and $a_3,b_3$. Based upon the need for the generation of parameters for best score alignment comparisons for previous values of $a_i$ and $b_j$ in the sequences of A and B, it will be seen that not all of the best score alignment computation processes can be carried out simultaneously. Thus for example, best score computation for $a_1,b_2$ and $a_2,b_1$ must await the results of the computation process for $a_2,b_2$. Similarly, the computation process for $a_1$, $b_1$ must await the results of the computation processes for $a_1,b_1$ $a_2,b_1$ and $a_1,b_2$. Consequently, it would be entirely inefficient to perform the algorithm depicted in FIG. 1 for an exemplary four-by-four matrix with a separate processor for each combination of $a_i$ and $b_j$. On the contrary, it would be most efficient to use only that number of processors which equals to the maximum number of processors being used at any one time, based upon the sequence of parameter generation required, as shown in FIG. 1. Accordingly, as seen in the right most portion of FIG. 1, the Smith and Waterman algorithm for a four-by-four matrix, that is for $A = a_1,a_2,a_3,a_4$ and $B = b_1,b_2,b_3$ and $b_4$; may be carried out by four computation processors with appropriate interconnections to assure the transfer of necessary parameters from processor to processor.

In the language of VLSI array processor design, the left-most portion of FIG. 1 is referred to as a systolic parallel processor array and the right-most portion of FIG. 1 is referred to as a signal flow graph. The technique for mapping algorithms into systolic parallel processor arrays and the technique for projecting such graphs into signal flow graphs may be understood best by referring to the text entitled VLSI Array Processors by S. Y. Kung, published by the Signal and Image Processing Institute of the University of Southern California, Copyright 1986.

The signal flow graph of the right side of FIG. 1, illustrates that the systolic processor array graph on the left side may be horizontally projected into a signal flow configuration which requires only four processor elements to carry out the four-by-four matrix algorithm. For the example, as shown in FIG. 1, each such processor on the right-most portion of FIG. 1 is permanently associated with an element of the A sequence, namely $a_1,a_2,a_3$, and $a_4$, respectively. On the other hand, the B sequence elements, namely, $b_1,b_2,b_3$, and $b_4$, respectively, are sequentially applied in a serial manner through the elements so that the first alignment best score computation occurs at $a_1,b_1$.

Figure 2:
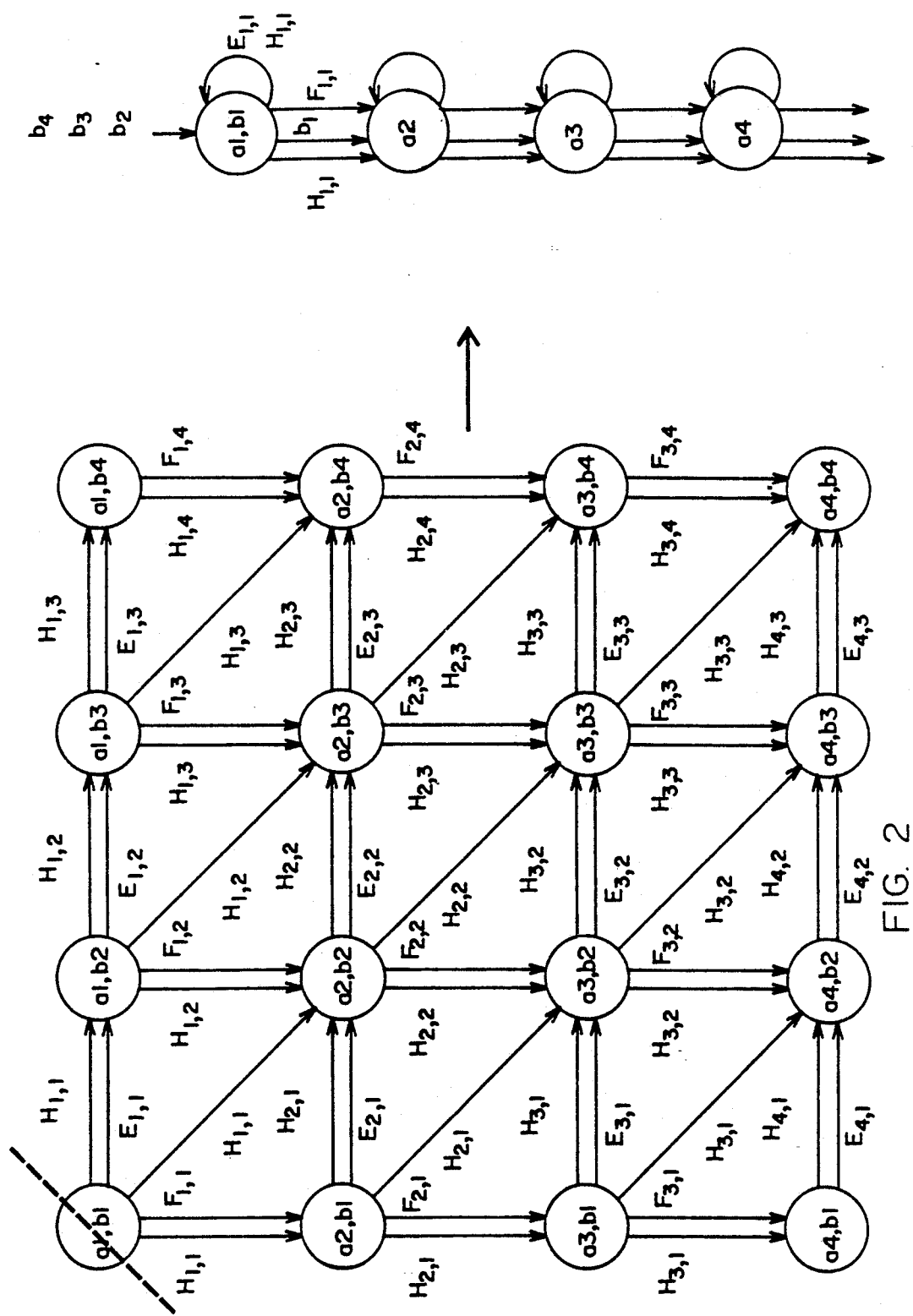
FIGS. 2-9 illustrate sequential snapshot representations of the algorithm steps of the signal processor hereof in a four-by-four exemplary matrix.

The lines with arrow heads associated with each of the elements in the right-most portion of FIG. 1, represent parameter values that are either transferred from element to element in series or are fed back and used in the same element for the next computation. More specifically, FIG. 2 represents a combined systolic array graph and horizontal projection graph at a "snapshot" in time at which the $a_1,b_1$ alignment computation is taking place as represented by the dashed line through the $a_1,b_1$ processor in the left portion of FIG. 2. The $b_1$ signal has been applied to the first processor to permit the computation of the score ending at $a_1,b_1$. The parameter values emanating from this first sequence computation are represented by the arrow head lines emanating from the first processor element shown therein at the right most portion of FIG. 2. As seen therein, $E_{1,1}$ and $H_{1,1}$ are both fed back into the $a_1$ element for the subsequent computation. In addition, the $H_{1,1}$ the $F_{1,1}$ and the $b_1$ signals are transferred to the next processor element with which $a_2$ is permanently associated.

Figure 3:
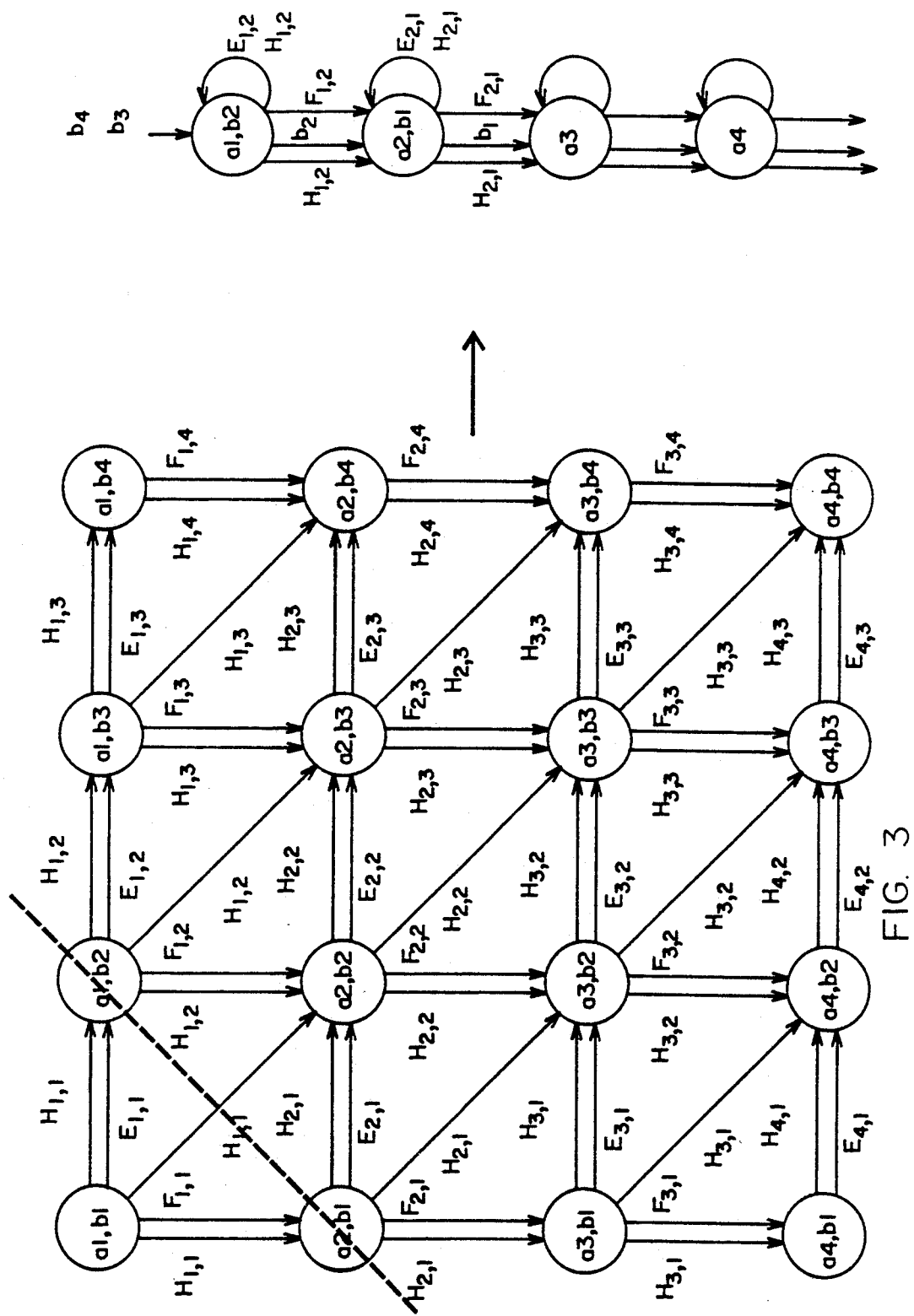
Figure 4:
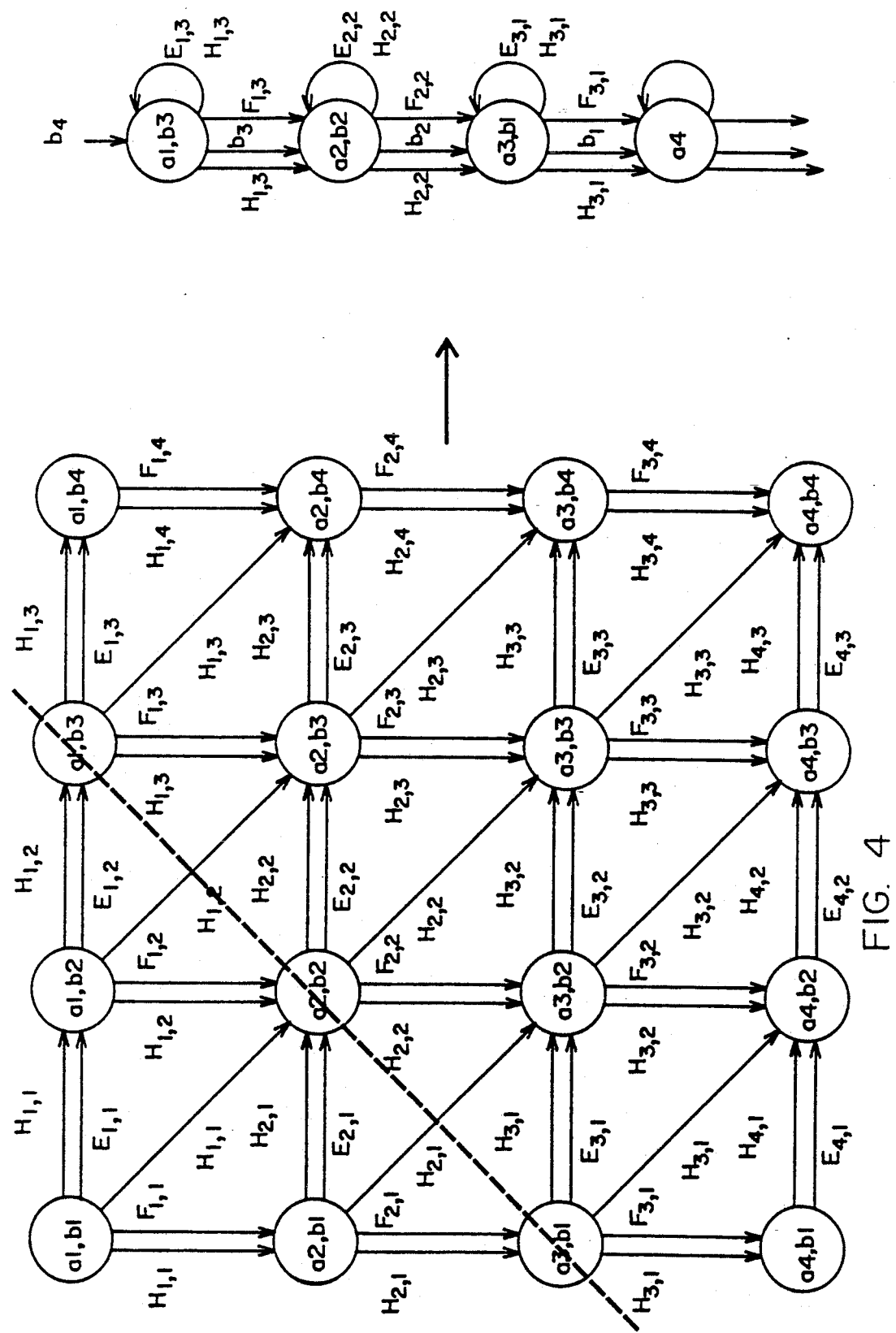
Figure 5:
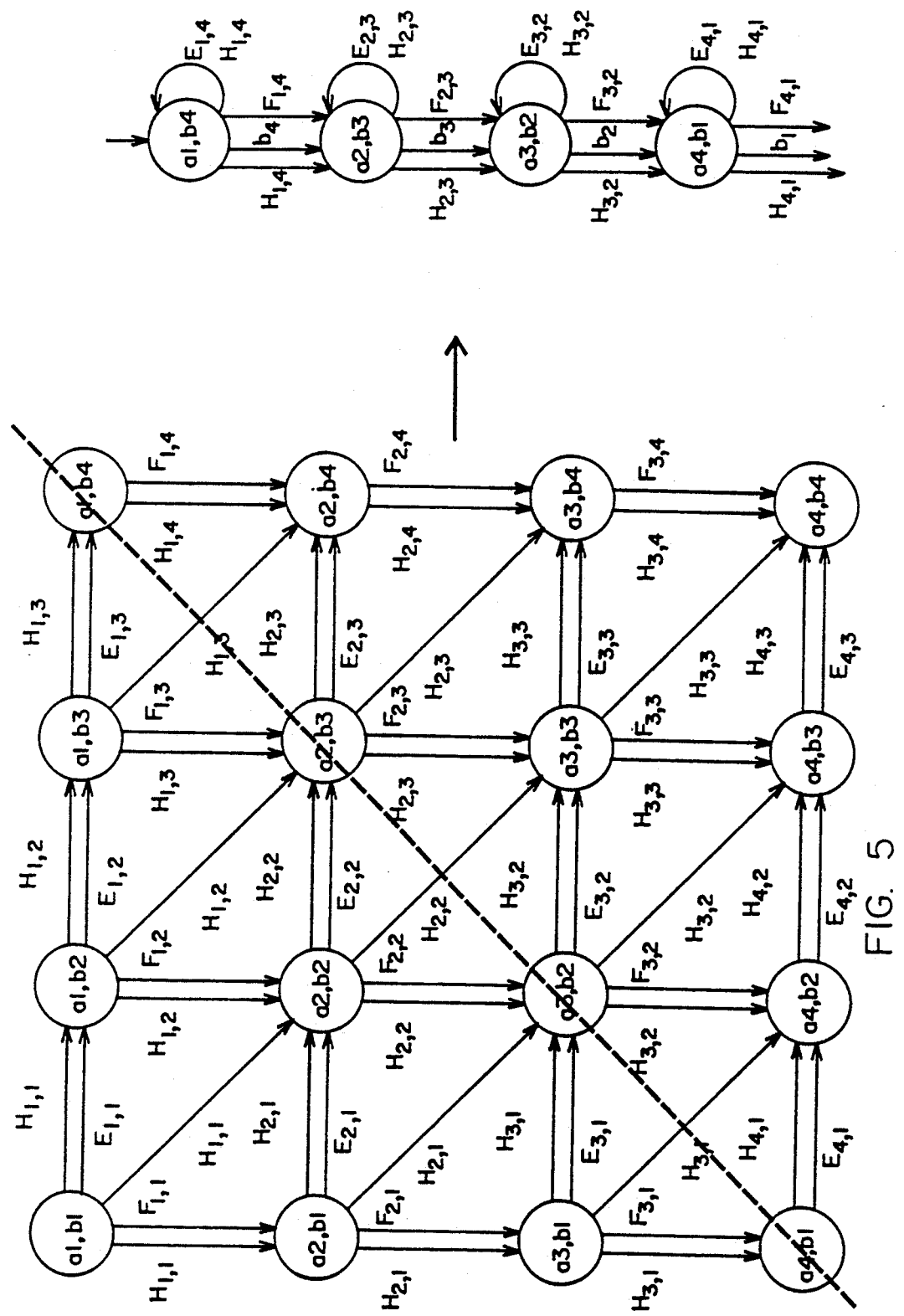
Figure 6:
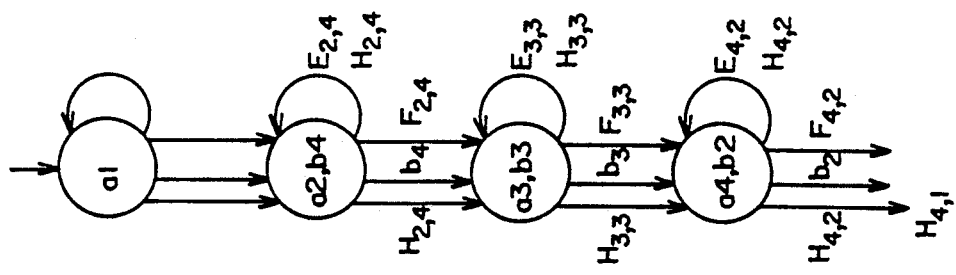
Figure 6:
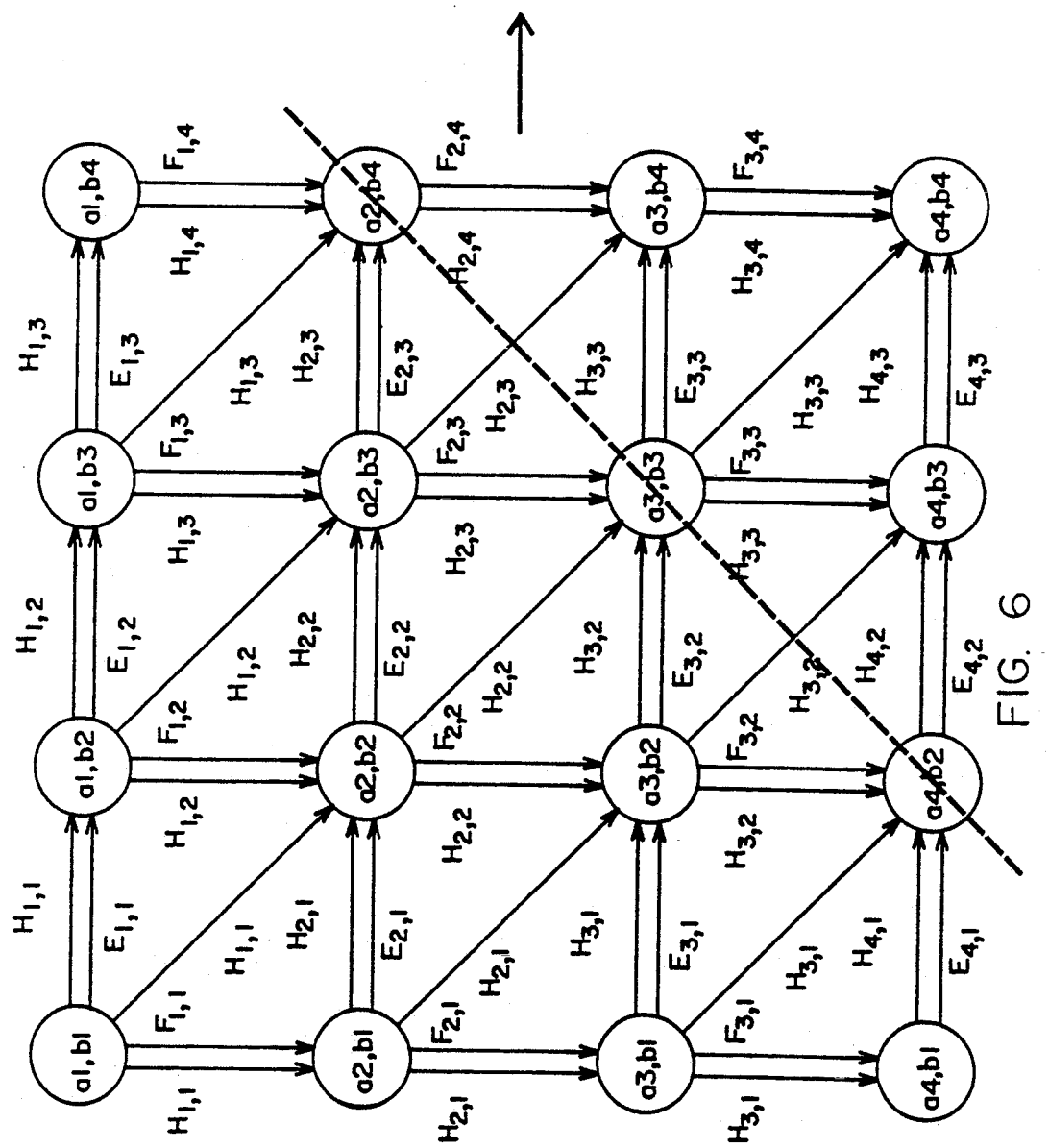
Figure 7:
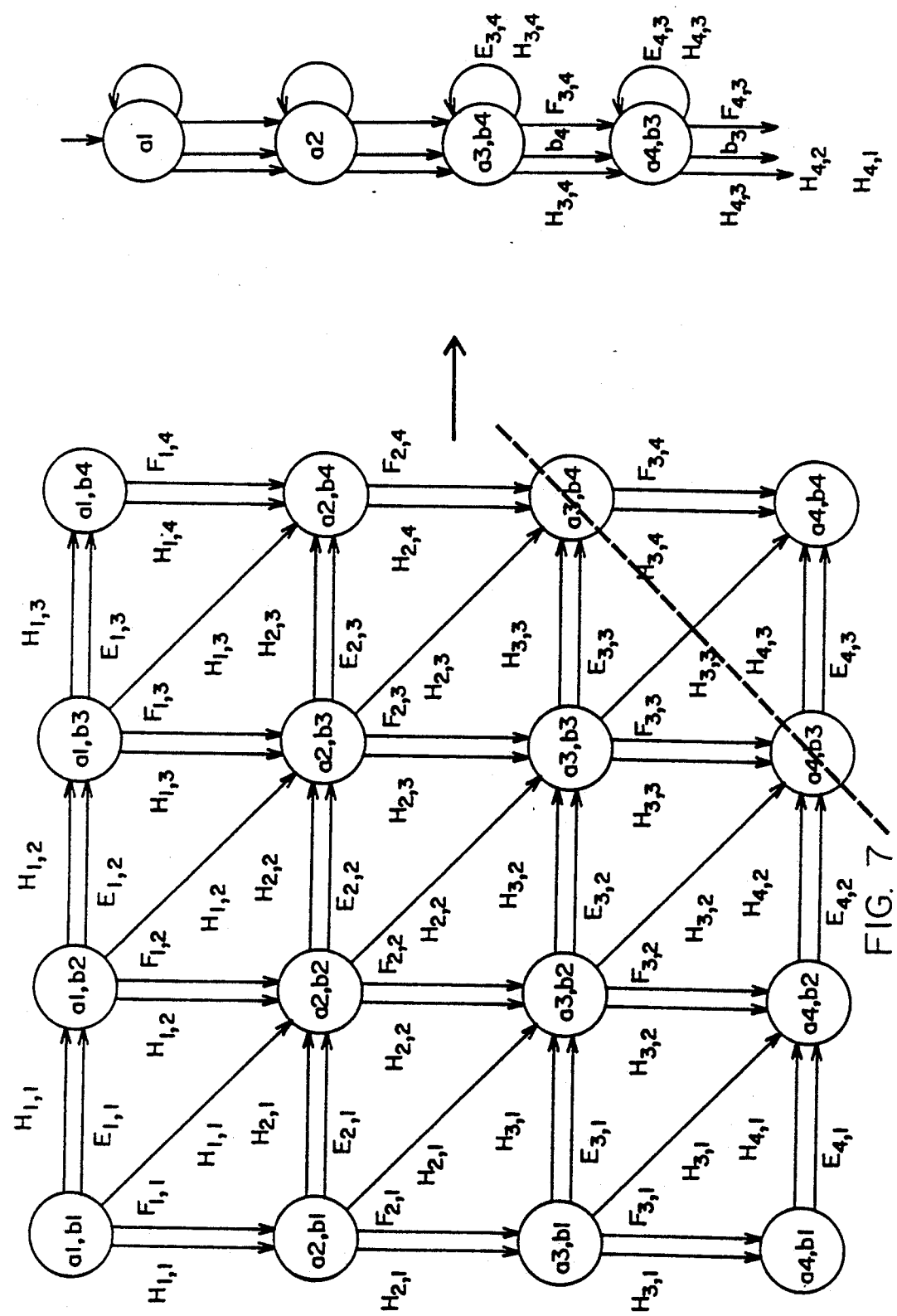
Figure 8:
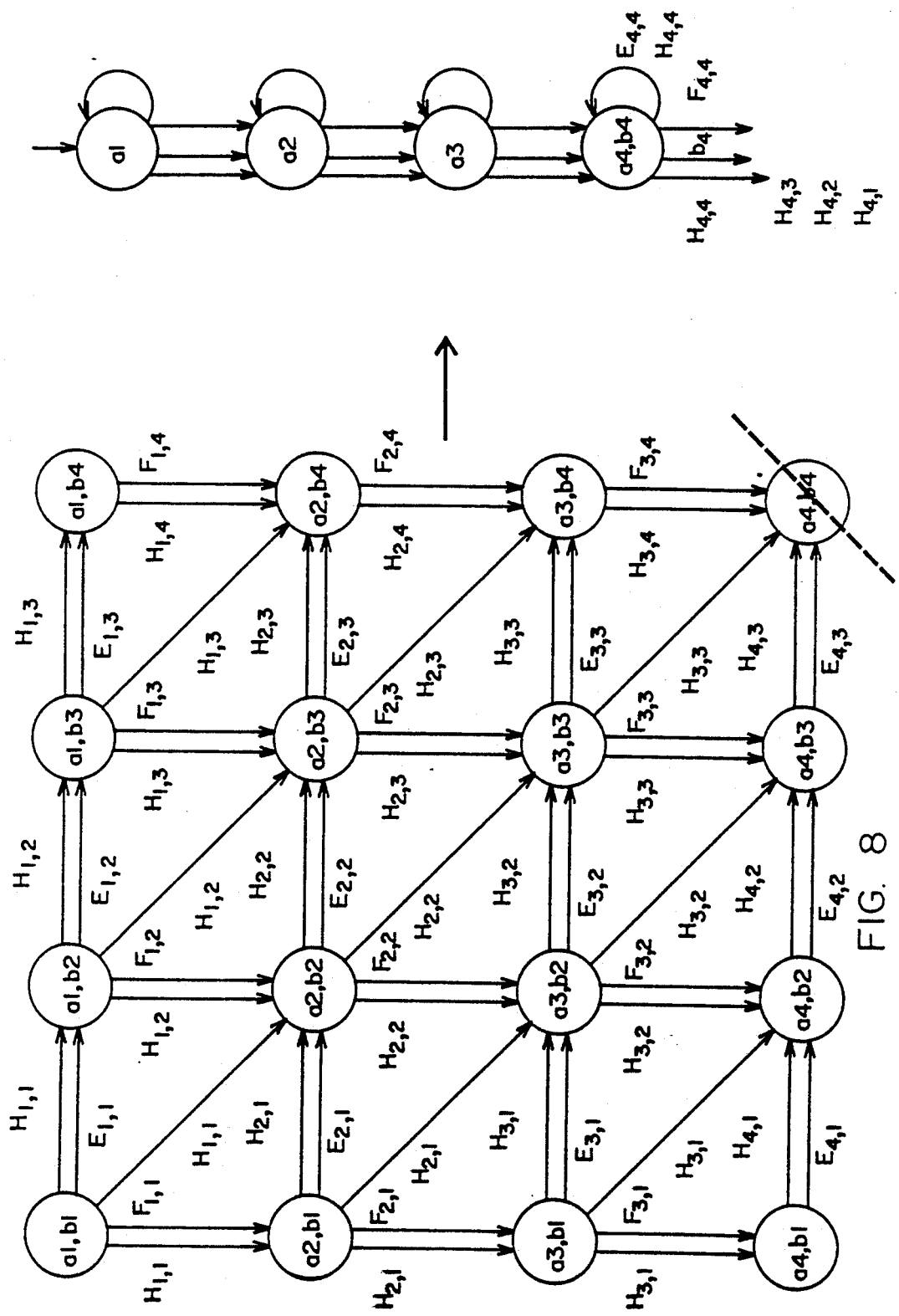

The next subsequent snapshot of sequence operation is shown in FIG. 3, and as illustrated by the dashed line in the left most portion of FIG. 3, this snapshot finds the top-most sequence processor in the right-most portion of FIG. 3, operating on the $a_1,b_2$ computation and the processor below the first operates on the $a_2,b_1$ computation. Each of these first two element processors generates appropriate parameter signals required by computations in the next snapshot period which is shown in FIG. 4, each element with a new value of $b_j$ entering the top-most element and the value of $b_j$ processed by the top most element being transferred to the next element along with the other required parameters for the algorithm.

This process continues, snapshot after snapshot, as represented by FIGS. 5, 6, 7 and 8. This example illustrates that the four-by-four matrix of processors for calculating the best score of any alignment between sequences A and B in the Smith and Waterman algorithm can be achieved with only four actual processors operating in an appropriate sequence. It, of course, requires the appropriate signals representing parameters required by the algorithm to be transferred from processor to processor as illustrated in snapshot to snapshot sequence of FIGS. 2 to 8.

Figure 9:
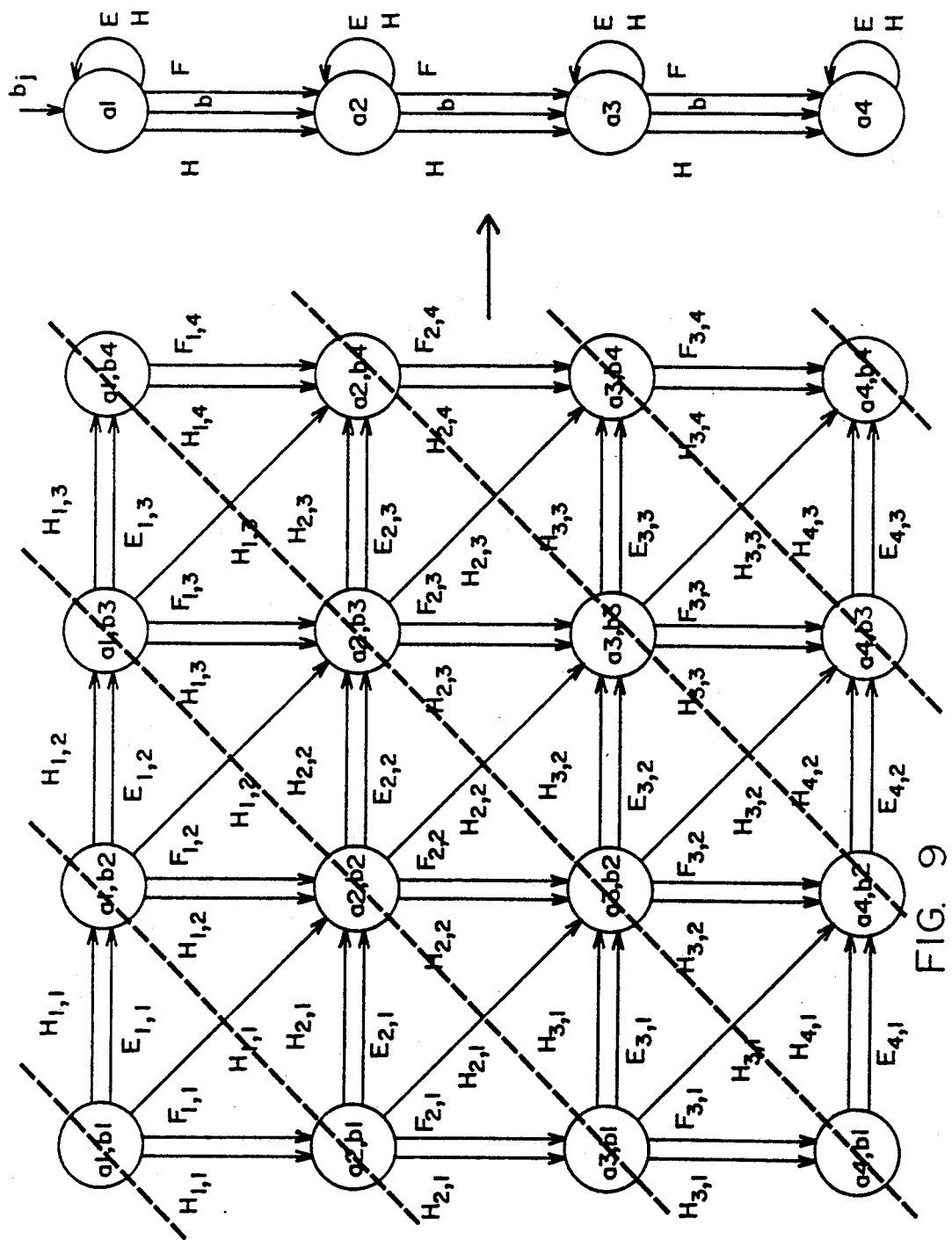

The signal flow through four processors represented by the right-most portion or signal flow graph portion of FIG. 9, may be used to carry out all the required steps of the algorithm for a four-by-four matrix in seven snapshots or clock periods represented by the seven dashed lines of the left-most portion or systolic processor array portion of FIG. 9. It will be understood however, that the four-by-four matrix of processors of FIGS. 2–9, are presented herein by way of illustration only. It would be highly preferable to provide many more than four processors in order to be able to compare sequences having a great deal more than just four elements In fact, it will be seen hereinafter that the integrated circuit (IC) of the present invention provides sixteen such processors. In addition, the architecture of each such IC permits the serial interconnection of the sixteen processors on one chip with the sixteen processors on another chip, so that a large number of such processors can be tied together from chip to chip to provide a long sequence of interconnected processors In the present invention, up to 512 such processors can be tied together to from a block and up to 8,192 such blocks or 4,194,304 such processors can be effectively interconnected without external software. The IC chip of the present invention, when operating in conjunction with other such chips, can compare sequences as long as 4,194,304 elements without the aid of external software.

Figure 10:
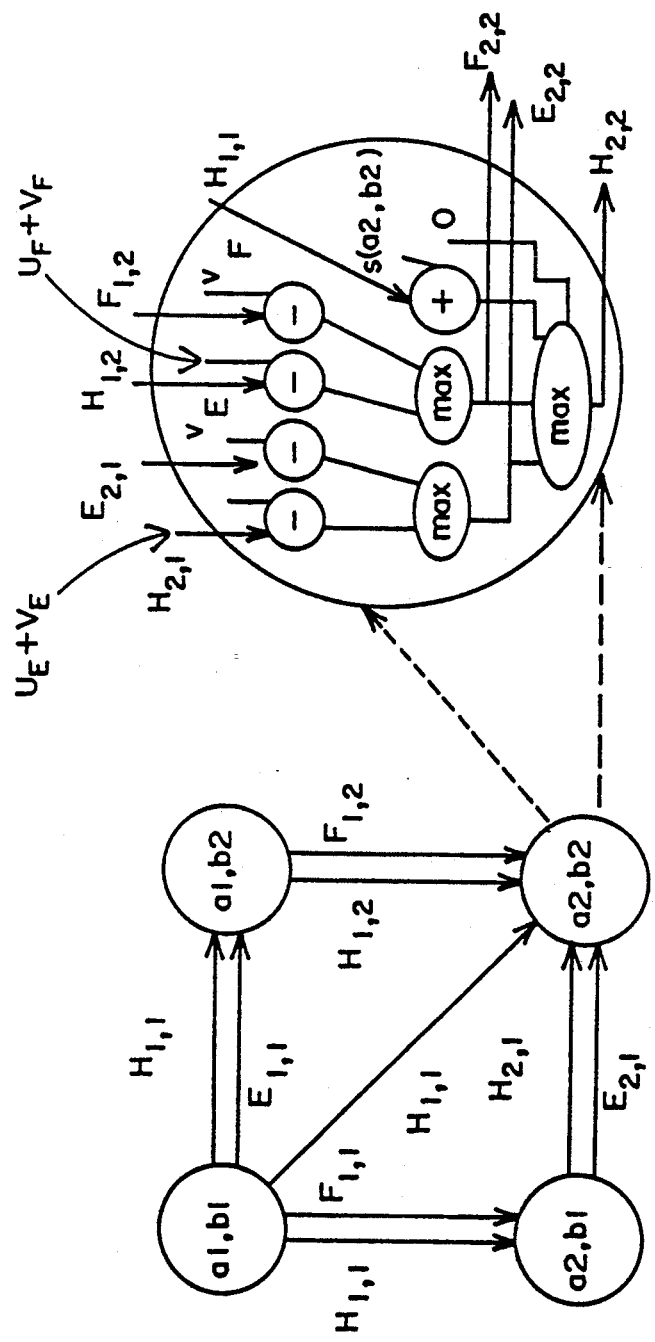
FIG. 10 is a graphical schematic illustration of the manner in which the architecture of a processor element of the signal processor hereof performs the algorithmic steps for a particular matrix element.

The logical operations actually carried out by each element of the systolic processor array of FIGS. 2–9 may be better understood by reference to FIG. 10. In FIG. 10 the computations and parameter generation that occur within the $a_2, b_2$ processor are shown by way of example. As seen in FIG. 10, in each such processor there are four subtractors, an adder and three calculators of maximums. The relevant equations are:

$$H_{1,1} = \max \{0, H_{0,0} + s(a_1, b_1), E_{1,1}, F_{1,1}\}$$
$$E_{1,1} = \max \{H_{1,0} - (u_E + v_E), E_{1,0} - v_E\}$$
$$F_{1,1} = \max \{H_{0,1} - (u_F + v_F), F_{0,1} - v_F\}$$

$$H_{1,2} = \max \{0, H_{0,1} + s(a_1, b_2), E_{1,2}, F_{1,2}\}$$
$$E_{1,2} = \max \{H_{1,1} - (u_E + v_E), E_{1,1} - v_E\}$$
$$F_{1,2} = \max \{H_{0,2} - (u_F + v_F), F_{0,2} - v_F\}$$

$$H_{2,1} = \max \{0, H_{1,0} + s(a_2, b_1), E_{2,1}, F_{2,1}\}$$
$$E_{2,1} = \max \{H_{2,0} - (u_E + v_E), E_{2,0} - v_E\}$$
$$F_{2,1} = \max \{H_{1,1} - (u_F + v_F), F_{1,1} - v_F\}$$

$$H_{2,2} = \max \{0, H_{1,1} + s(a_2, b_2), E_{2,2}, F_{2,2}\}$$
$$E_{2,2} = \max \{H_{2,1} - (u_E + v_E), E_{2,1} - v_E\}$$
$$F_{2,2} = \max \{H_{1,2} - (u_F + v_F), F_{1,2} - v_F\}$$

In accordance with these equations, the input parameters for the $a_2$, $b_2$ processor comprise: $H_{2,1}$, $E_{2,1}$, $H_{1,2}$, $F_{1,2}$ and $H_{1,1}$. The $H_{2,1}$ parameter is applied to a subtractor to which is also applied the value $U_E + V_E$, a constant which may be stored within the processor. The parameter $E_{2,1}$ is applied to a subtractor to which is also applied the constant value $V_E$. $H_{1,2}$ is applied to a subtractor to which is also applied the constant $U_F + V_F$ and the parameter $F_{1,2}$ is applied to a subtractor to which is also provided the value $V_F$. The parameter $H_{1,1}$ is applied to an adder to which is also supplied a similarity function of $a_2$ and $b_2$ which, as previously indicated, is a constant greater than zero if $a_2$ is equal to $b_2$ and a constant less than zero for $a_2$ not equal to $b_2$.

The output of the first two subtractors, that is the subtractors to which the parameters $H_{2,1}$ and $E_{2,1}$ are applied, respectively, are applied to a maximum value calculator. The output of this maximum value calculator is, by definition, $E_{2,2}$ and the outputs of the other subtractors are applied to a separate maximum value calculator, the output of which is by definition, the parameter $F_{2,2}$. $E_{2,2}$ and $F_{2,2}$ are applied to a third maximum value calculator to which is also applied the output of the adder and a zero signal. The output of this third maximum calculator is by definition $H_{2,2}$ which is the score of the alignment ending at $a_2, b_2$.

Figure 11:
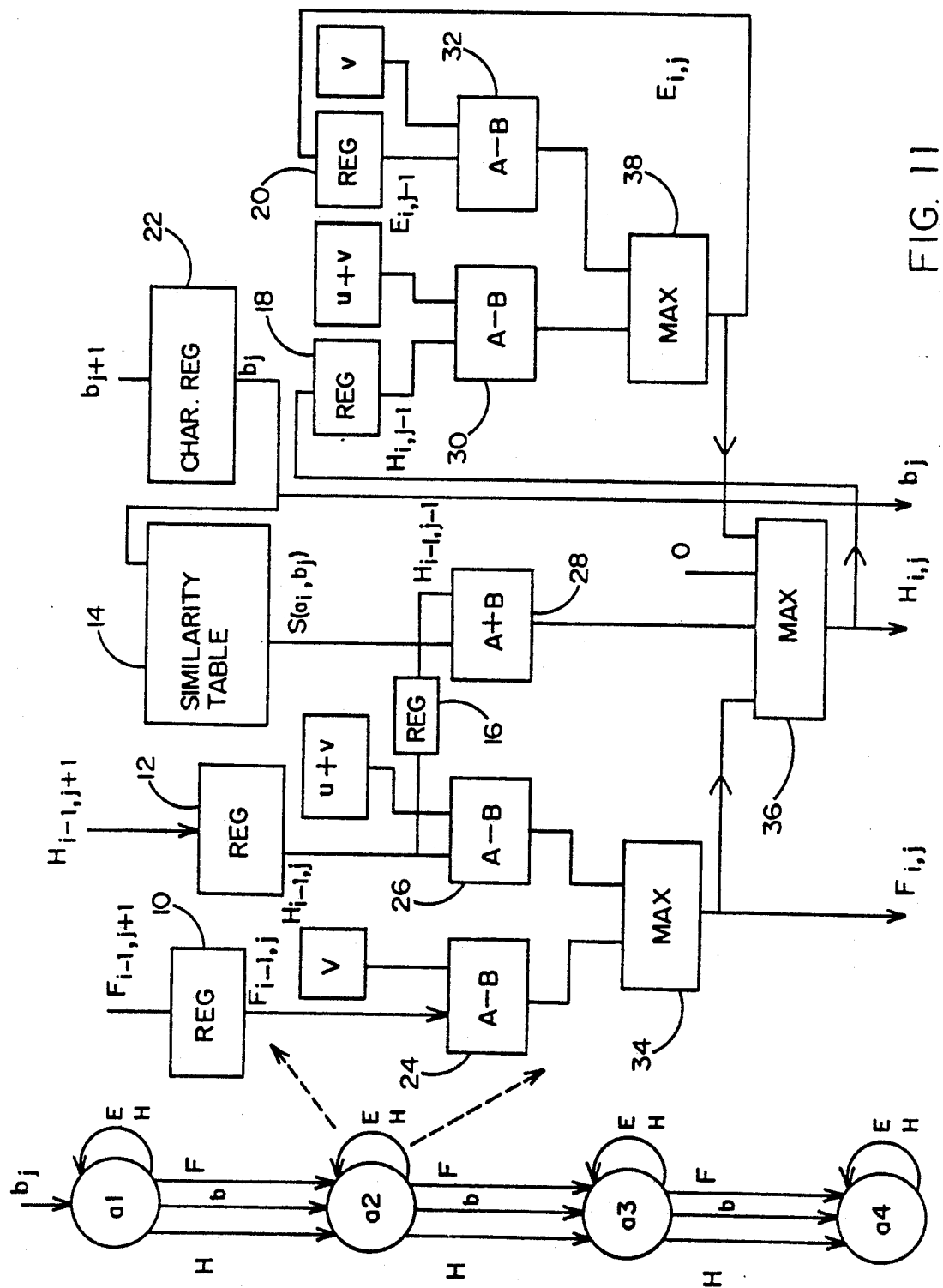
FIG. 11 is a generalized, functional block diagram of a processor element of the signal processor hereof.

The functional block diagram of a processor of the present invention for performing the subtractions, additions and maximum calculator functions illustrated in FIG. 10, is shown in FIG. 11. As seen in FIG. 11 at the upper left hand corner thereof, the input parameters are $F_{i-1,j+1}$, $H_{i-1,J+1}$ and the sequence element $b_{j+1}$. As also seen in FIG. 11, there are a plurality of registers, namely a register into which the input parameters are stored for one clock cycle, as well as registers into which parameters generated within the processor of FIG. 11 are stored for one clock cycle. The purpose of these registers, as will be seen hereinafter, is to provide the necessary delays in signal transfer to the adder, subtractors and maximum calculators so that the processor carries out its algorithmic steps in the proper sequence and at the appropriate time and furthermore, so that the various algorithm parameters are available at the appropriate adder, subtractors and maximum calculators when the addition, subtractions and maximum calculations actually occur. More specifically, it will be seen hereinafter that each register of FIG. 11 imparts the appropriate amount of time delay in signal flow through the processor so that the input of any j parameter occurs simultaneously with the output of a j−1 parameter. Thus for example the $F_{i-1,j+1}$ parameter is input to a register 10 which, because of its predetermined delay, outputs simultaneously therewith, the parameter $F_{i-1,j}$. Similarly, the input to register 12, which is $H_{i-1,j+1}$ occurs substantially simultaneously with the output which is $H_{i-1,j}$. The output of registers 10 and 12 are applied to subtractors 24 and 26, respectively, to which are also supplied the constants, V and U+V, respectively. The output of register 12 is also applied to a register 16, the output of which is $H_{i-1,j-1}$, which is applied to an adder 28. Also applied to adder 28 is a signal indicative of the similarity of lack thereof between $a_i$ and $b_j$, referred to previously in the algorithm as the function $s(a_i, b_j)$. This similarity value is generated by a similarity table 14, based upon the $a_i$ stored therein and the $b_j$ input therein, from a character register 22, the input to which is $b_{j+1}$.

The output of subtractors 24 and 26 are both applied to a maximum calculator 34, the output of which by definition is $F_{i,j}$ which is an output signal of the processor of FIG. 11 for use in subsequent processor. The output of maximum calculator 34 is also applied to a maximum calculator 36. Other inputs to maximum calculator 36, include the output of the adder 28 and a zero signal. The output of maximum calculator 36 is by definition, the score value signal $H_{i,j}$ which constitutes the principal information desired from the comparison of two sequences ending at $a_i, b_j$. The output of maximum calculator 36 is also applied to register 18, the output of which is thus $H_{i,j+1}$ which is, in turn, applied to the subtractor 30. Subtractor 30 also receives input U+V. The output of subtractor 30 is applied to maximum calculator 38, the output of which it will be seen hereinafter is $E_{i,j}$. Parameter $E_{i,j}$ is applied both to the maximum calculator 36 as an input thereto and also to register 20 in the right-most portion of FIG. 11, as an input to that register. The output of register 20 is thus $E_{i,j+1}$ which is applied to subtractor 32 to which a second input is the constant V. The output of subtractor 32 is also applied to maximum calculator 38 to produce the $E_{i,j}$ parameter.

Figure 12:
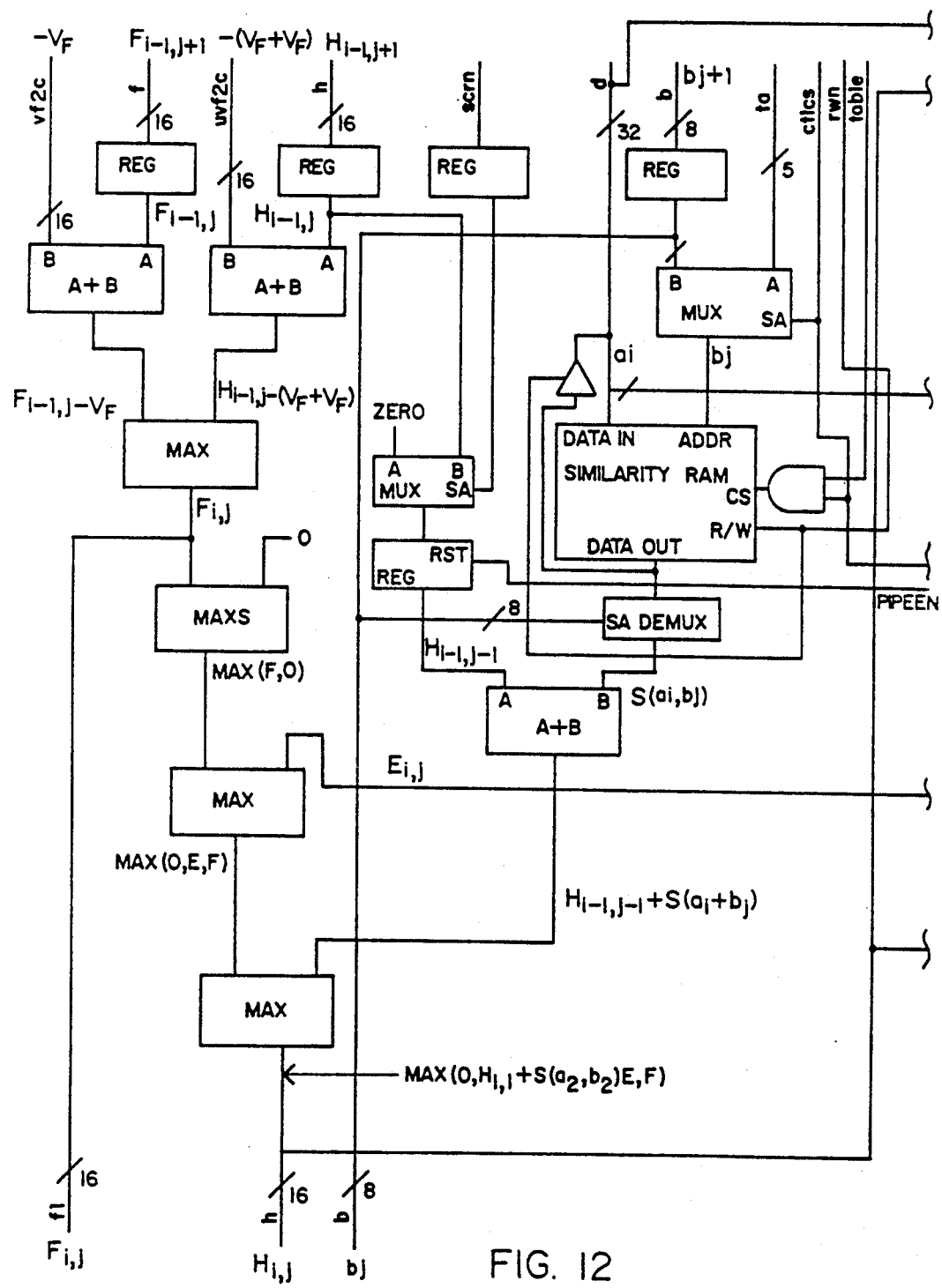
FIGS. 12 and 13, when taken together, represent a block diagram of an actual processor element of the signal processor hereof.
Figure 13:
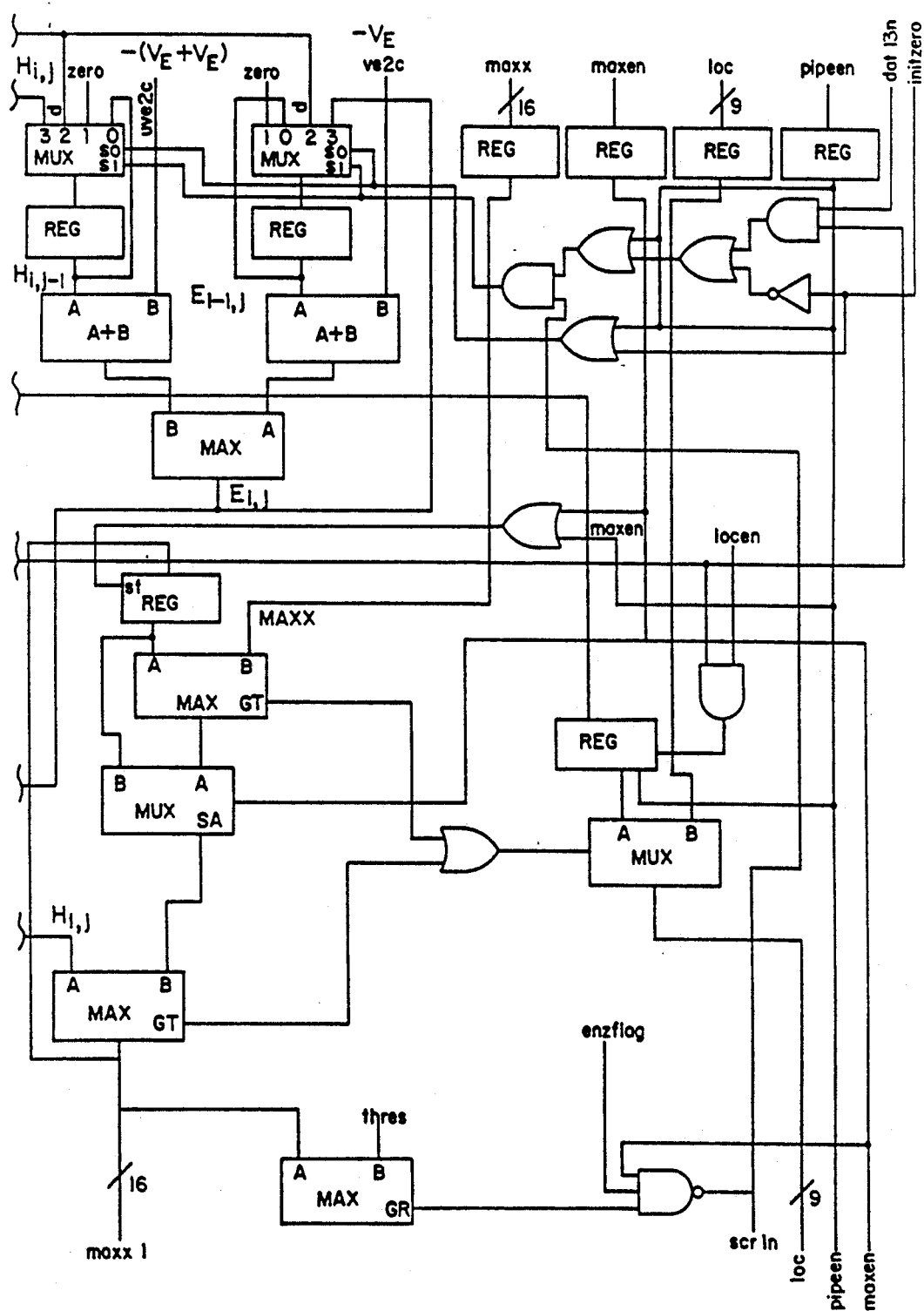

Thus it will be seen that the architecture depicted in FIG. 11 carries out the various computations of a single processor for comparing two elements of the sequence A and B in accordance with Waterman and Smith Algorithm, including providing the necessary time delay registers, subtractors, adder and maximum calculators to receive the appropriate parameters and to generate the parameters for the subsequent processor which, in turn, computes the same type of information for two sequence characters. It will be understood that the block diagram of FIG. 11 is of a functional nature only, to indicate the treatment of parameters that occur within one processor However, the actual implementation of a processor is illustrated in FIGS. 12 and 13 taken in combination. Reference will now be made to FIGS. 12 and 13 for a more detailed understanding of the actual architecture of a processor of the present invention.

The principal differences between the functional block diagram of FIG. 11 and the actual block diagram of FIGS. 12 and 13 are the following: Subtractors of FIG. 11 are actually adders with one of the inputs inverted prior to application to the adder, so that the equivalent operation is a subtraction. Another distinction is that maximum calculators only accept two values, consequently, there are more maximum calculators in the actual implementation of FIGS. 12 and 13 than there are in the functional block diagram of FIG. 11. Still another distinction between the functional block diagram and the actual block diagram of the processor of the present invention, is the fact that the latter must incorporate signals, which in addition to the parameter signal previously discussed in conjunction with FIG. 11, must be input and output to permit proper interface from processor to processor, as well as to facilitate appropriate timing of operation. In addition, there are at least two additional capabilities in the actual block diagram of FIGS. 12 and 13 as compared to the functional block diagram of FIG. 11. Specifically, in the actual block diagram, an additional maximum calculator is provided which compares the value of $H_{i,j}$ to a preselected threshold value permitting the logic of the actual processor to ignore any scores which fall below the preset threshold value. In addition, the actual architecture of the processor of the present invention, provides an additional signal path through all processors in a block, as well as an additional maximum calculator in each processor of a block, for comparing the maximum value of each processor with a maximum value of every other processor and propagating a signal which indicates when the maximum value of this particular processor is in fact the highest $H_{i,j}$ of all of the processors in the block Furthermore, it will be seen that in the block diagram of the actual processor of the present invention, the similarity table of the functional block diagram of FIG. 11, comprises a random access memory in which the data bus of the chip brings the character data into the similarity RAM, where it can be either written into the RAM or read out of the RAM and $b_j$ is applied to the addressed terminal of the RAM. In addition, the similarity RAM is provided with a chip select signal and a read/write signal as well as a data output which provides the similarity function output from a look-up table in the similarity RAM. A table address signal (TA) is also applied to the address terminal of the similarity RAM through a multiplexer as a high order five byte address for the similarity RAM table.

Other signals shown used in the block diagram of FIGS. 12 and 13 include location input and location output, which provide an indication of the location of the current maximum value in the block of processors. Maximum enable input and maximum enable output signals enable the comparison of the locally generated maximum value with the input maximum value in each processor. A pipeline enable signal is used and its state indicates when the $F_{i,j}$ and $H_{i,j}$ values are valid data so that these values can be saved. Synchronous clear signals are also input and output to each processor. The synchronous clear input resets the $H_{i,j}$ value so that the maximum value does not exceed the threshold value and the synchronous clear output, under certain conditions, namely when the maximum value generated is greater than the threshold value, sets the H value of the next processor to zero. However, it will be understood that except for the timing control and logic control, the use of threshold and maximum value transfer from processor to processor, the functional effect of the actual architecture depicted in FIGS. 12 and 13 is identical to that explained previously in conjunction with FIG. 11.

Figure 14:
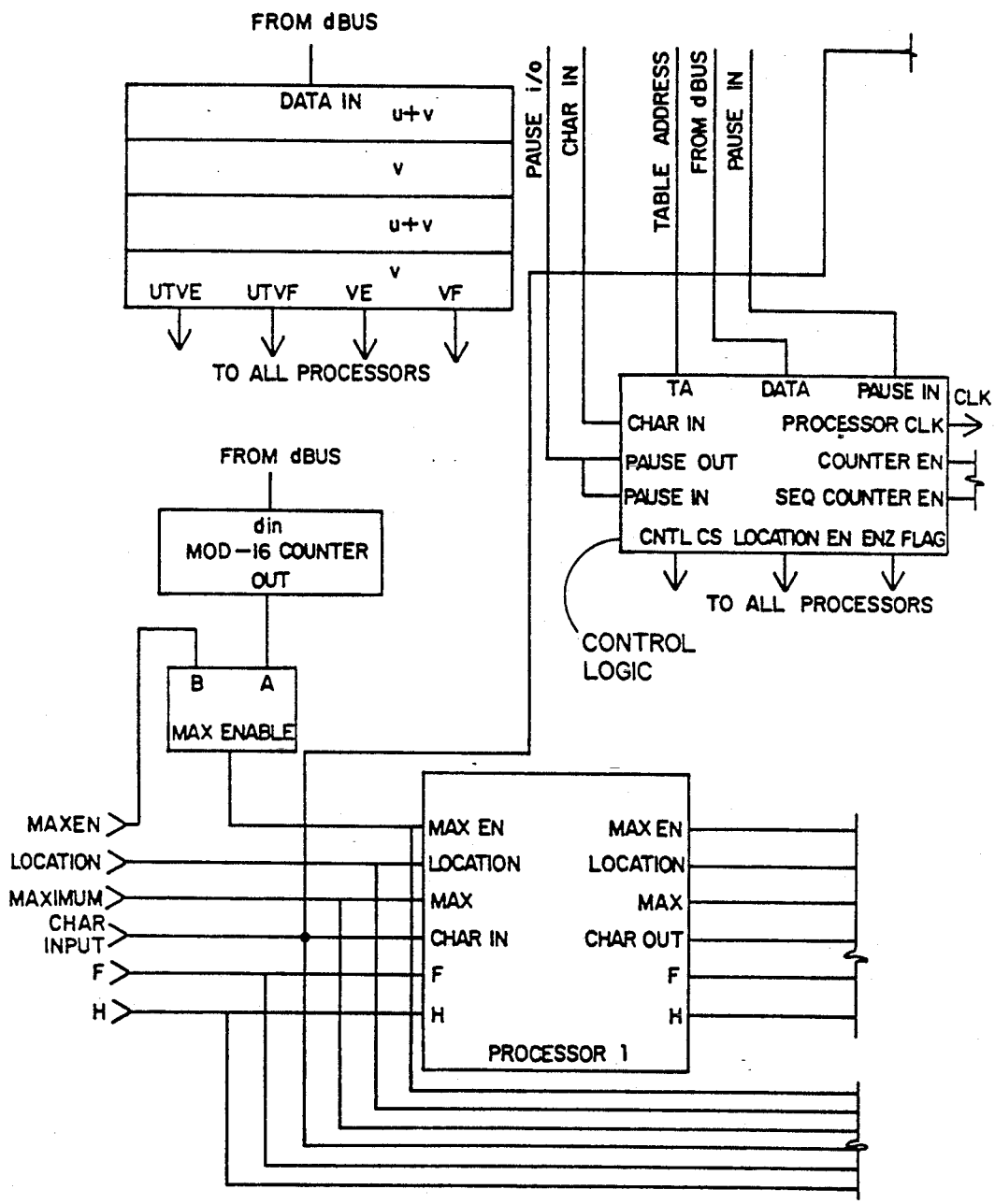
FIGS. 14 and 15, when taken together, constitute a schematic block diagram of the chip circuit of the present invention.
Figure 15:
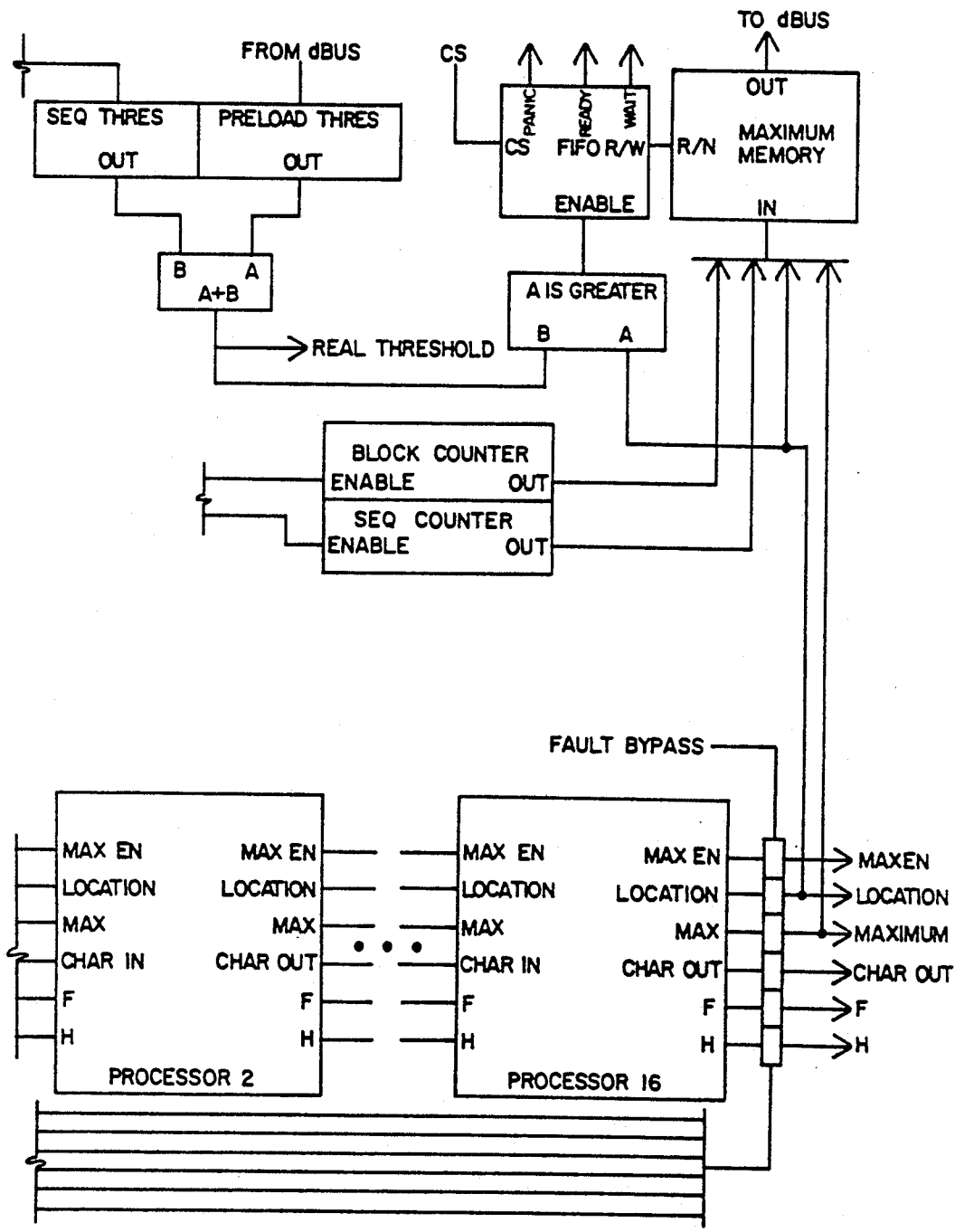

The manner in which the processors are integrated in a chip of the present invention and the other electronics associated with each circuit chip of the present invention will now be discussed in conjunction with FIGS. 14 and 15 which together comprise a functional block diagram of the biological information signal processor. Referring therefore now to FIGS. 14 and 15, it will be seen that each integrated circuit chip of the present invention comprises sixteen of the aforementioned processors connected in a serial array configuration in which a plurality of the aforementioned signals used within each processor, may be transferred from processor to processor on this particular chip, as well as to processors on other chips to which the present chip is connected. As previously indicated, without the aid of external software, up to 512 processors may be interconnected to form what is called a block and up to 8,192 such blocks may be interconnected without external software to handle one sequence All of the other elements of a signal processor of the present invention are designed to provide the requisite information, timing and signal flow input to and generated by the processors. Thus for example in the upper left-hand corner of FIG. 14, there is shown a plurality of registers which are loaded from a data bus to provide the U+V and V constants which are needed in all of the processors and which represent various values of a linear function, representing scoring penalties for insertions and deletions in the Smith and Waterman Algorithm Also provided in the integrated circuit chip of the present invention is a control logic device which controls the application of timing and logic signals to the processors, as well as signals which enable block and sequence counters, the outputs of which are stored in a maximum memory device shown in the upper right-hand corner of FIG. 15. The control logic also controls pause input and output signals which are used under certain conditions for temporarily halting the operation of the processors, such as when maximum memory is filled. The processor of the present invention also provides means for loading a threshold into the chip and for utilizing this threshold for enabling storage of maximums into memory only when the threshold is exceeded. The threshold registers are shown in the upper left-hand corner of FIG. 15. There is a preload threshold register which receives its input from the data bus and a sequence threshold register which receives its input from the character port when the chip is to be loaded with a query sequence threshold. Also provided is an adder which adds the sequence threshold and the preload threshold to provide what is referred to as a real threshold against which the scores of the respective processors are compared in a threshold comparator. A pair of counters is also provided, namely a block counter and a sequence counter. These counters enable the maximum memory to correlate the maximum score value with the sequence and the user defined block. A physical representation of the layout of the integrated circuit chip of the present invention is shown in FIG. 16.

Figure 16:
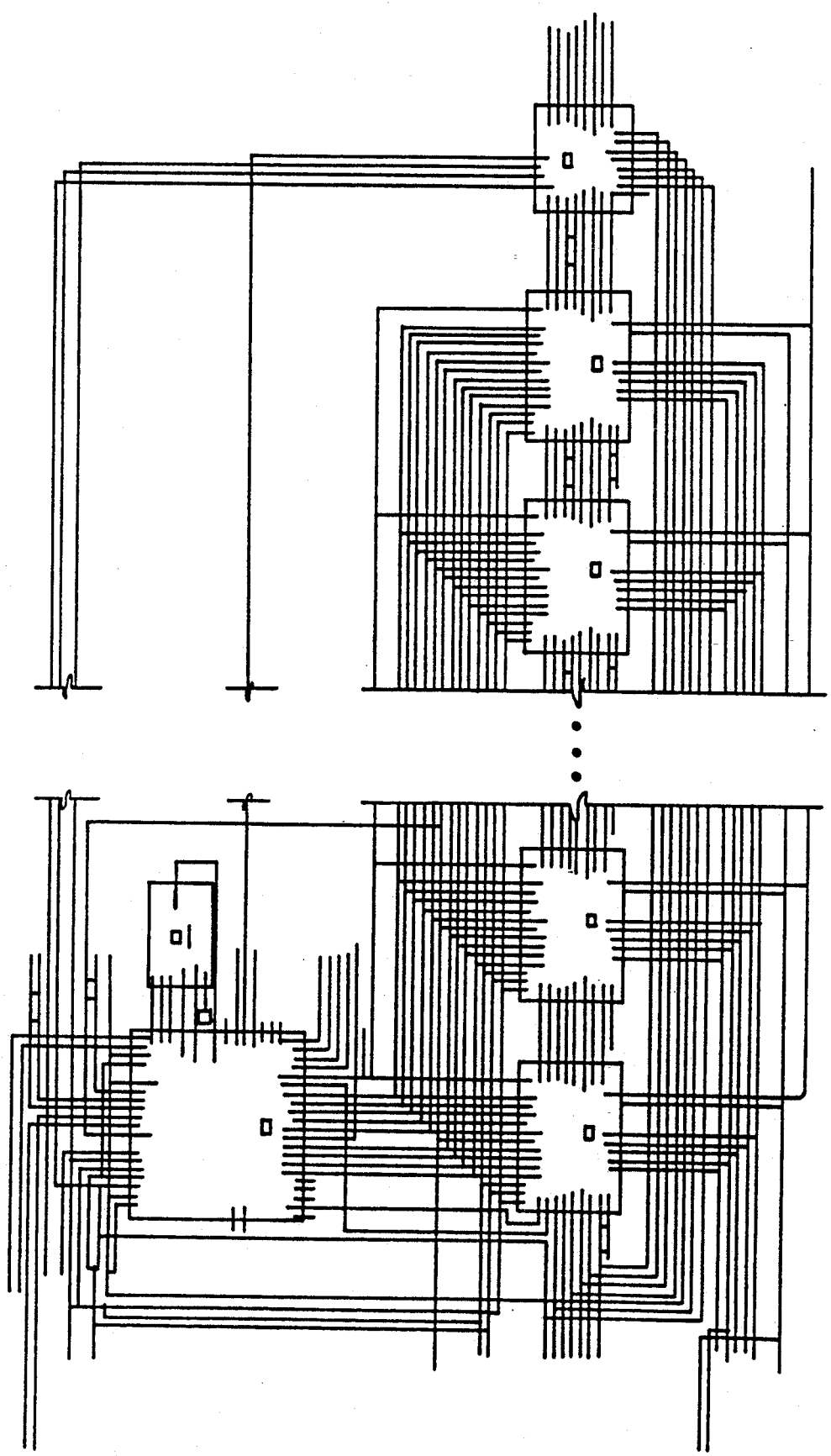
FIG. 16 is a layout schematic illustrating the physical configuration of the signal processing chip of the invention.

The sixteen processors are arranged in a serial array terminating in a pipeline register The device in the upper left-hand corner of FIG. 16 is a control block which comprises the control logic, counters and registers previously described in conjunction with FIGS. 14 and 15.

Figure 17:
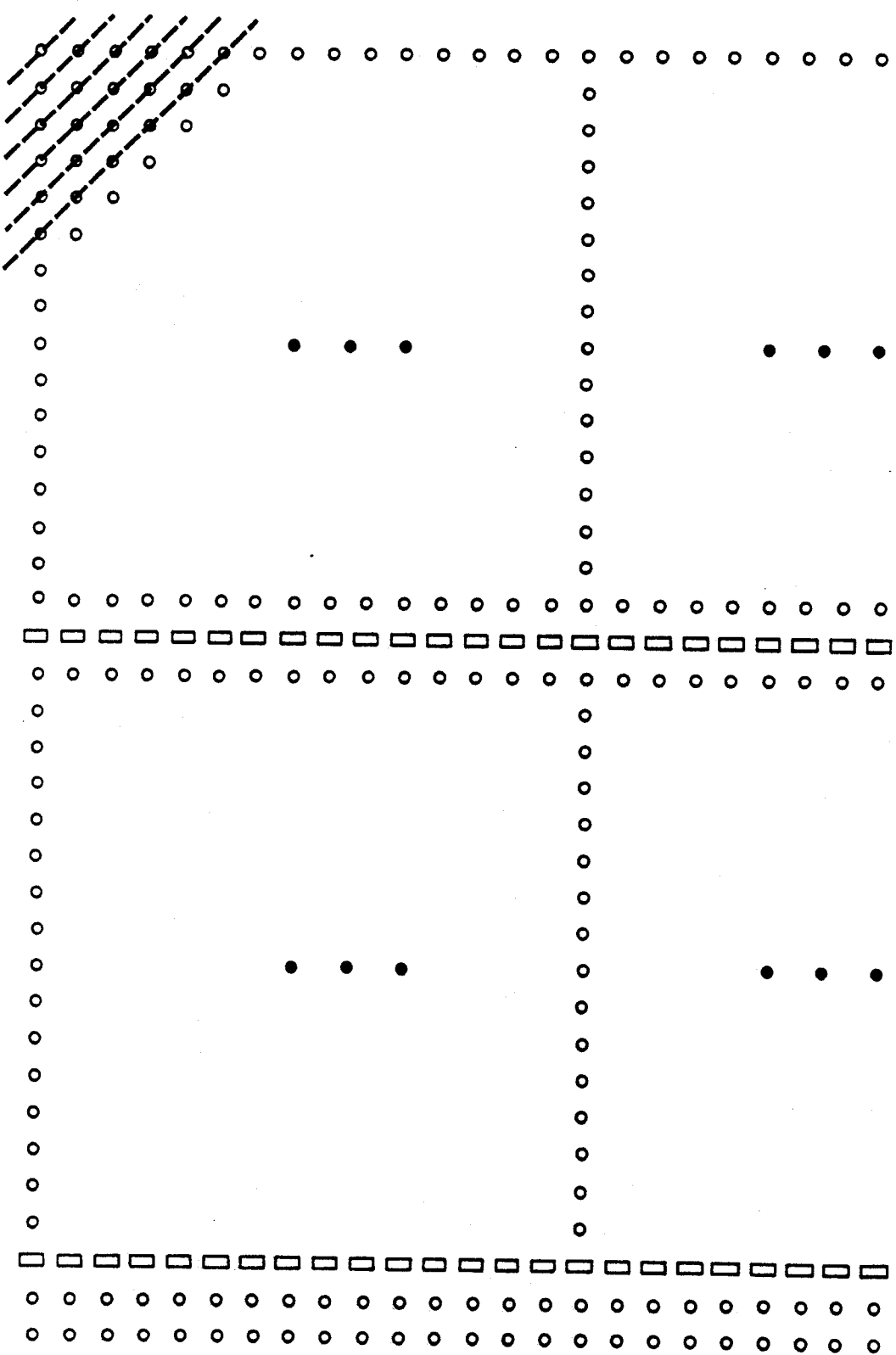
FIGS. 17 and 18 taken together provide a dependence graph mapping for multiple chips representing a total of 34 processors.
Figure 18:
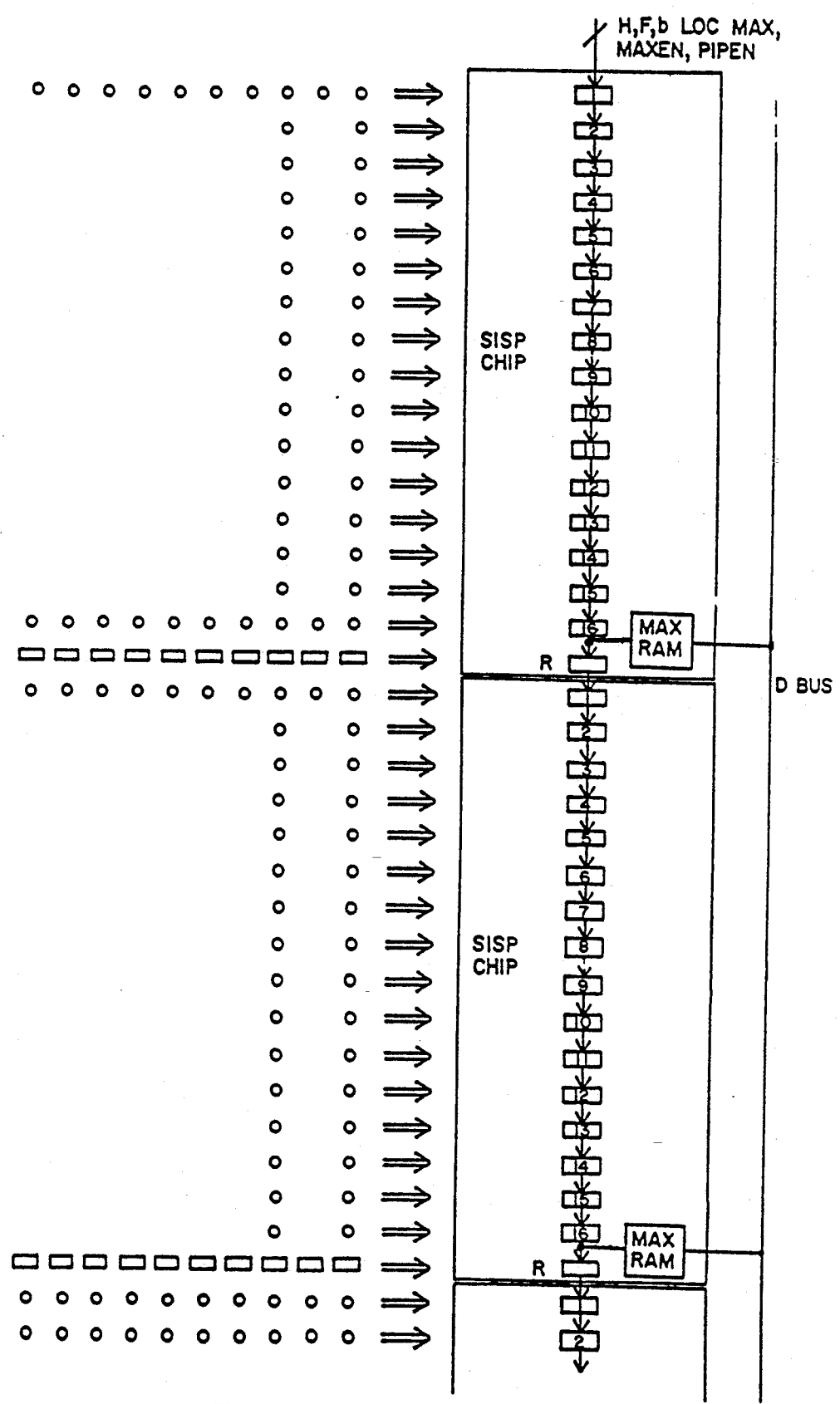

The interface between integrated circuit chips of the present invention may be best understood by referring to FIGS. 17 and 18 which provide an exemplary dependence graph for 34 processors on three separate chips, the latter being shown on the right side of FIG. 18. Each chip provides 16 processors and a pipeline register. In the dependence graph the pipeline registers are shown as rectangles which merely delay the operation between the last processor of one chip and the first processor of the next chip.

The dependence graph of FIGS. 17 and 18 is generally a larger matrix version of the graphs of FIGS. 1-9, except that it includes a sufficient number of processors to demonstrate the "block edge" behavior based upon a minimum block size of 16 elements. This "block edge" behavior is designed to prevent maximum score buffer overflow by resetting "H" values in the $a_{16}$, $b_{16}$ processor, the $a_{32}$, $b_{32}$ processor, etc. Only the "H" values which exceed the previously noted threshold and which are output in the horizontal and diagonal directions to the adjacent processors are reset.

This "block edge" resetting procedure constitutes a modification to the Smith and Waterman algorithm which is unique to the present invention. It is implemented in each chip by means of a boundary set zero enable signal (ENZ flag) in the control logic of FIG. 14. If this bit is set and the output H value is greater than the threshold value, then the SISP chip will reset the internally fedback E value and the $H_{i-1,j-1}$ value of the next SISP chip.

Figure 19:
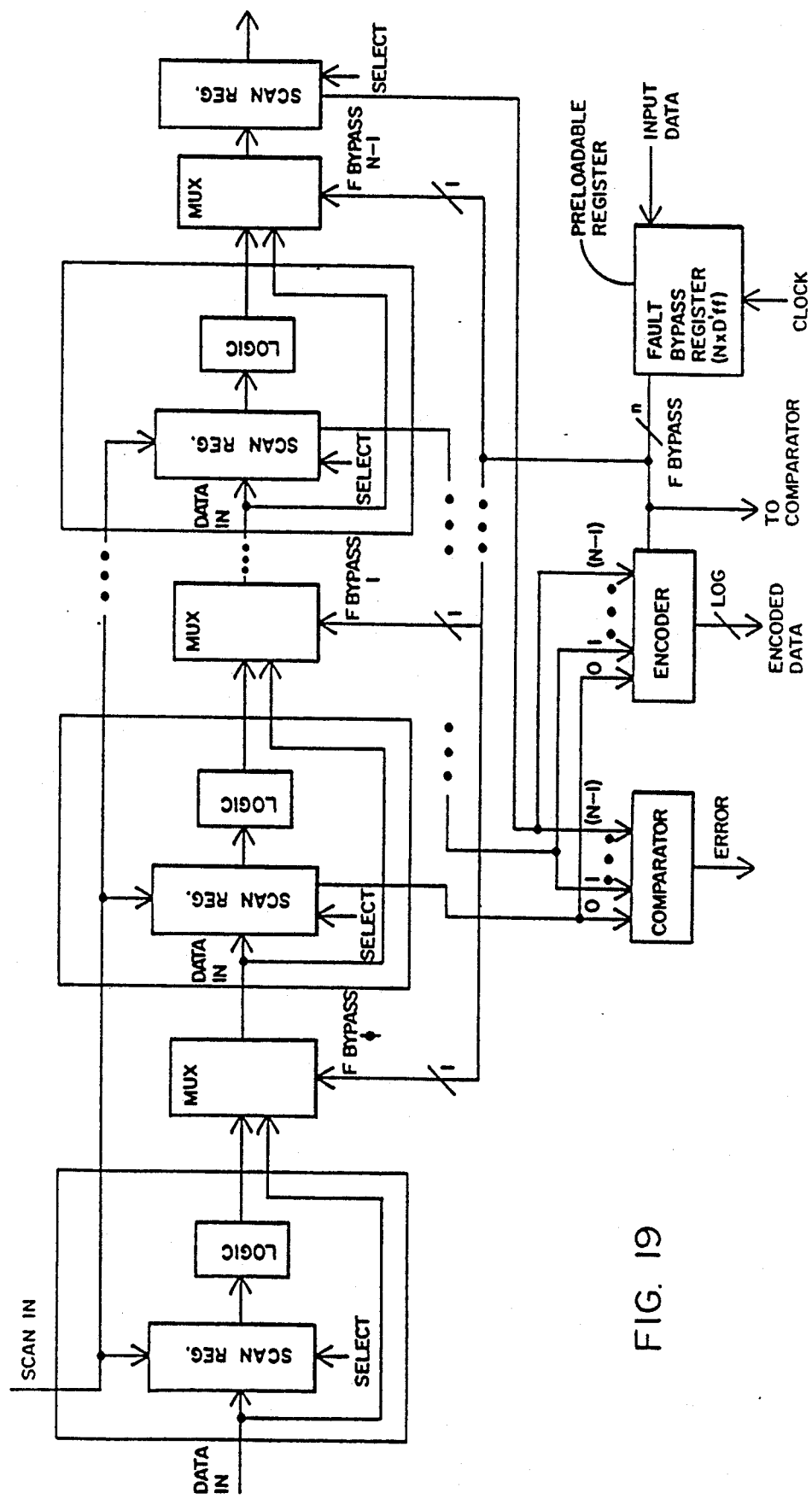
FIG. 19 is a block diagram of an integrated circuit chip of the present invention particularly illustrating the fault detection and bypass features thereof.

Reference will now be made to FIGS. 19 through 24 which relate to the fault detection and bypass circuitry of the present invention. As seen in FIG. 19, each processor element of the integrated circuit chip described herein, provides, in addition to the logic described previously for comparing two sequences of data, a scan register, the output of which is connected to a comparator and to an encoder. In addition, between each processor element shown in FIG. 19, there is also shown a multiplexer which is configured to receive two inputs, one from the output data of the immediately preceding logic of the processor element adjacent the multiplexer and one from the data into that same processor element. In addition, each such multiplexer provides a functional bypass control terminal, the logic state of which determines which of those two inputs is passed through the multiplexer to the next processor element. Each of these multiplexers is controlled by a fault bypass register which also provides inputs to the encoder. The function of each such multiplexer is to provide a means for bypassing any faulty logic and thus any faulty processor element which is detected as having a fault in the manner to be described hereinafter.

Figure 20:
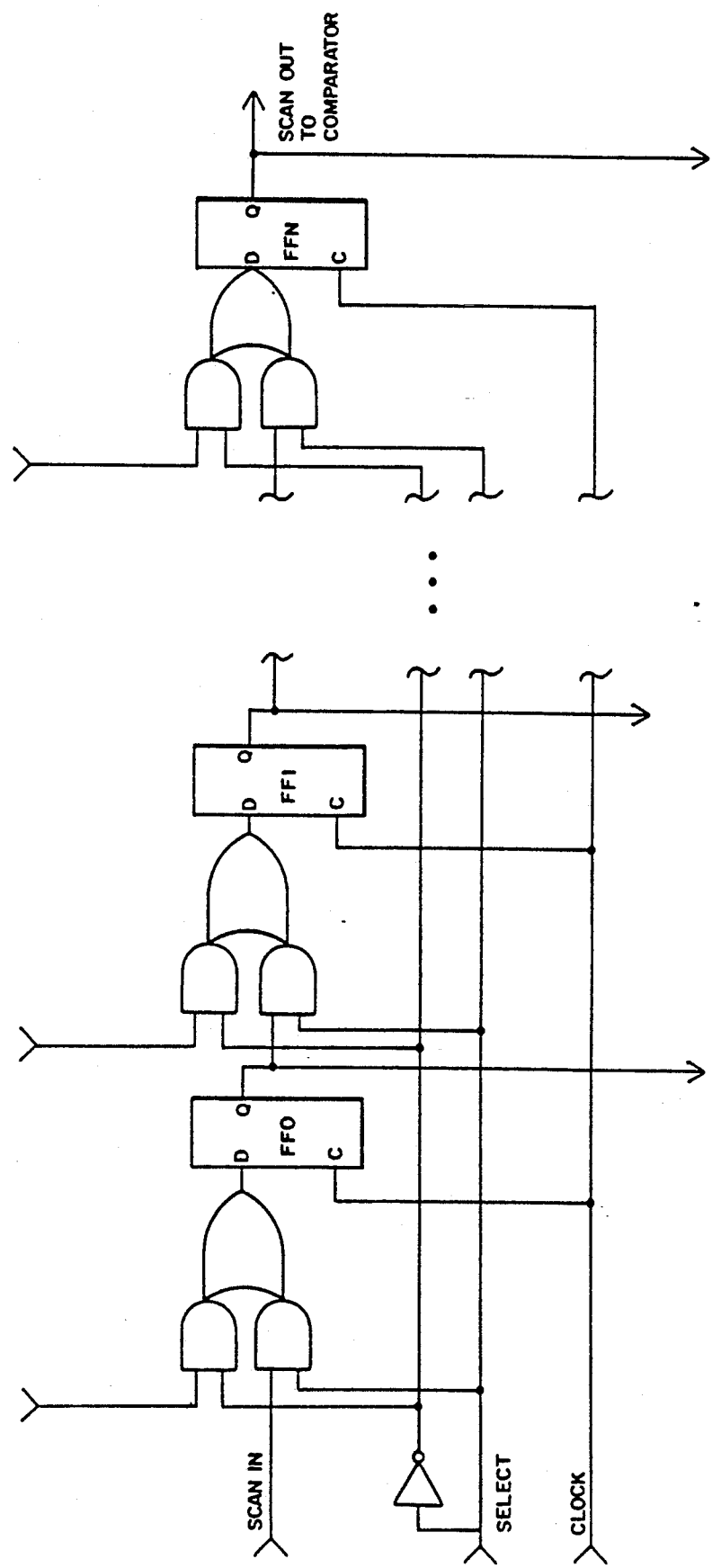
FIG. 20 is a schematic diagram of the scan register of the present invention.

As shown in FIG. 20, each scan register comprises a plurality of flip-flops. The number of such flip-flops is equal to the number of separate data bits that are passed through the processor elements as data-in and data-out. As seen further in FIG. 20, each such flip-flop has connected to its input data terminal, a pair of parallel AND gates connected to two inputs of an OR gate. One such AND gate receives one bit of data from the data-in to the processor element and the other such AND gate receives a scan-in signal which is used in the present invention to provide programmable vector inputs for assessing the fault configuration of the processor elements. A select signal which is input to all of the flip-flops in the scan register, effectively selects one or the other of the AND gates, depending upon whether it is desired to operate the scan register in a test mode or in an operational mode. The output of each such flip-flop, labelled "Q", provides one bit of output data, which as seen in FIG. 19, is passed in parallel with the other such bits of output data to the logic circuit of the particular processor element with which the scan register is associated. However, the output of each such flip-flop is also transferred as one input to the scan AND gate of the next flip-flop. Each such flip-flop is also connected to a clock line which controls the action of the flip-flop for transferring the logic level of the input signal at terminal D to the output at terminal Q in a well known manner.

When the fault detection and bypass circuit of the present invention is activated, the select signal shown in FIG. 20 is set to a logic 1 state so that the upper AND gate of each flip-flop receives a zero logic signal on its select input terminal and the lower AND gate of each flip-flop receives a logic 1 signal on its select input terminal. This causes the flip-flops in the scan register to effectively ignore the pipeline data-in and instead generate output data which reflects the scan-in signal which is serially shifted into each scan register shown in FIG. 19. After each of the scan registers on a chip is loaded in this manner with a known set of vector bits, the logic state of the select signal is then reversed so that the upper AND gate associated with each flip-flop and each scan register is then activated. Data in the scan registers is then clocked out through the corresponding logic circuits and into the next adjacent processor element. Consequently, the scan output of each scan register is then determined by the logic of the preceding processor element and each of these scan outputs is transferred to the comparator and encoder on each chip.

It will be understood that the logic shown in the systolic array of FIG. 19 in each processor element is identical. Accordingly, because the scanned-in data for fault detection purposes was also identical as input to each scan register, the corresponding scan output produced by the preceding logic circuit should produce identical scan output logic levels. Thus in the embodiment of the invention shown herein where each such chip provides 16 processor elements, 16 scan output signals, namely scan 0 through scan 15, should always produce identical signal levels in response to a fault detection vector. Accordingly, an event wherein one or more of such scan output signals is different from the remaining such signals, indicates that an error in one or more of the logic circuits has occurred and that a fault therein exists.

The present invention thus provides a means for assessing whether any of the plurality of scan output signals differs from the remaining such scan output signals each time one such vector is shifted through the various processor elements in the manner described. It will be understood that by providing a plurality of selected vector bit combinations, sufficient fault testing of all of the transistor circuits within each logic circuit of each processor element, may be thoroughly tested, thereby assuring detection of any fault that might exist.

Figure 21:
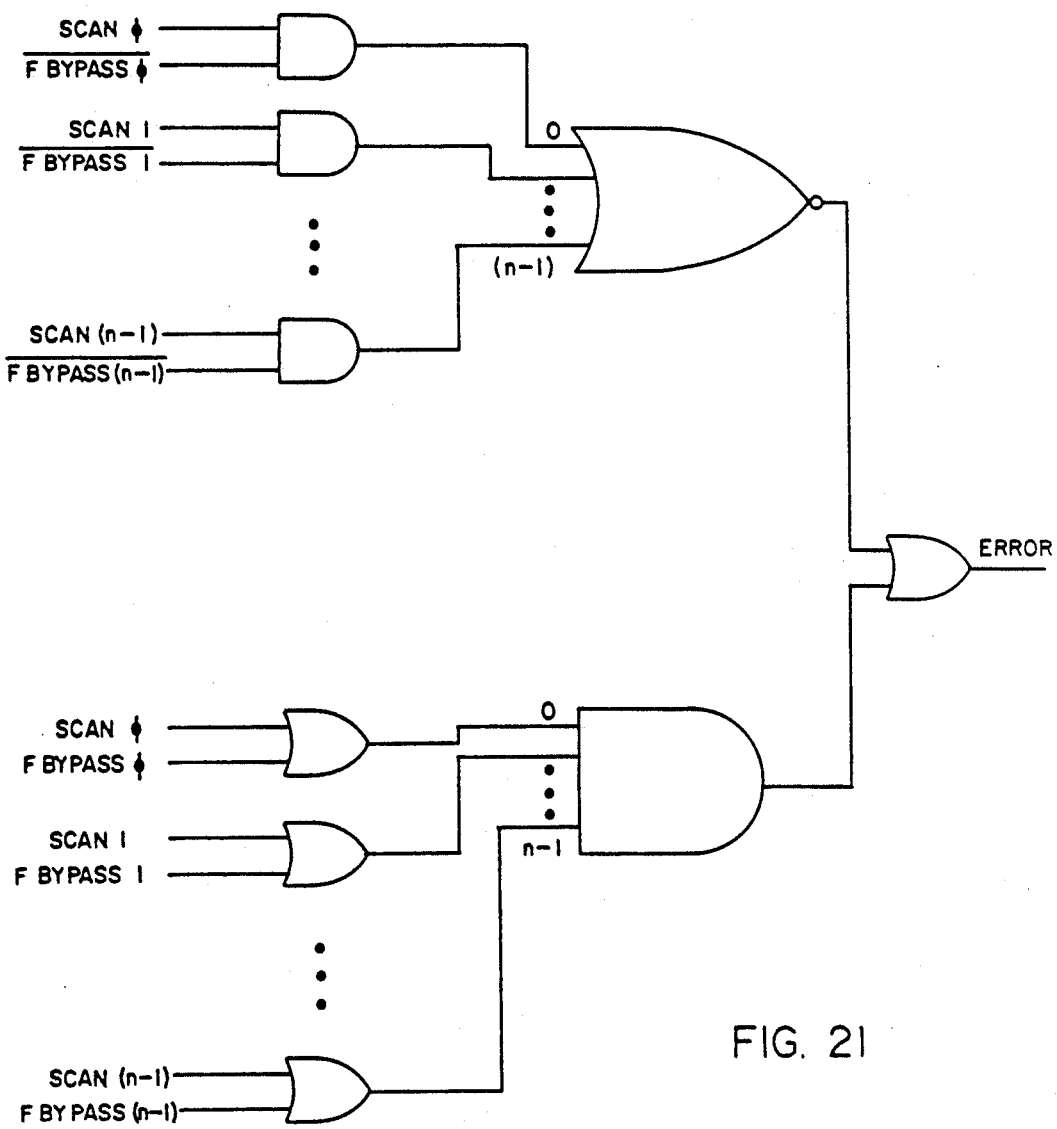
FIG. 21 is a logic diagram of the comparator of the present invention.

The comparator of the present invention is shown in FIG. 21. As shown therein, the comparator circuit of the present invention comprises a plurality of AND gates, each of two inputs, and a plurality of OR gates, each also of two inputs. The number of AND gates and the number of OR gates are both equal to the number of scan signals. Thus, in the embodiment of the invention disclosed herein, there would be sixteen such AND gates and sixteen such OR gates in each chip comparator. Each AND gate and each OR gate receives at one terminal, a respective one of the scan output signals. Each AND gate also receives at the other one of its input terminals, a respective inverted fault bypass signal which corresponds to the multiplexer immediately behind or preceding the corresponding scan register. Each second terminal of the respective OR gates in the comparator receives a non-inverted form of the same fault bypass signal. The output of each of the aforementioned AND gates is connected to a common multi-input terminal NOR gate and the output of each of the aforementioned OR gates is connected to a similar multi-terminal AND gate.

The outputs of the NOR gate and the AND gate are in turn connected to a single two terminal OR gate, the output of which is the error signal, the logic state of which indicates whether or not a fault has been detected. More specifically, if the error signal is in a zero logic condition, an error is indicated, and if the error signal is in a one logic condition, that corresponds to no detection of errors.

The comparator shown in FIG. 21 operates as a result of the conventional Boolean logic of the gates shown therein and generates an error signal that is a zero logic error signal if one or more of the scan signals is different from all of the remaining scan signals and simultaneously, the corresponding bypass signals are in a zero logic state, indicating that the logic in which a fault has been detected, has not yet been bypassed. On the other hand, if all the scan signals are identical, then the output error signal is set to a one, indicating that no error has been detected. Furthermore, if one or more scan signals is different from the other remaining scan signals, but the corresponding bypass signals have been set to a one logic state, then the error is again in a one state, indicating no error. This latter condition is provided to assure that a new error will not be erroneously indicated when a previously detected error has already been bypassed by means of a corresponding multiplexer.

Figure 22:
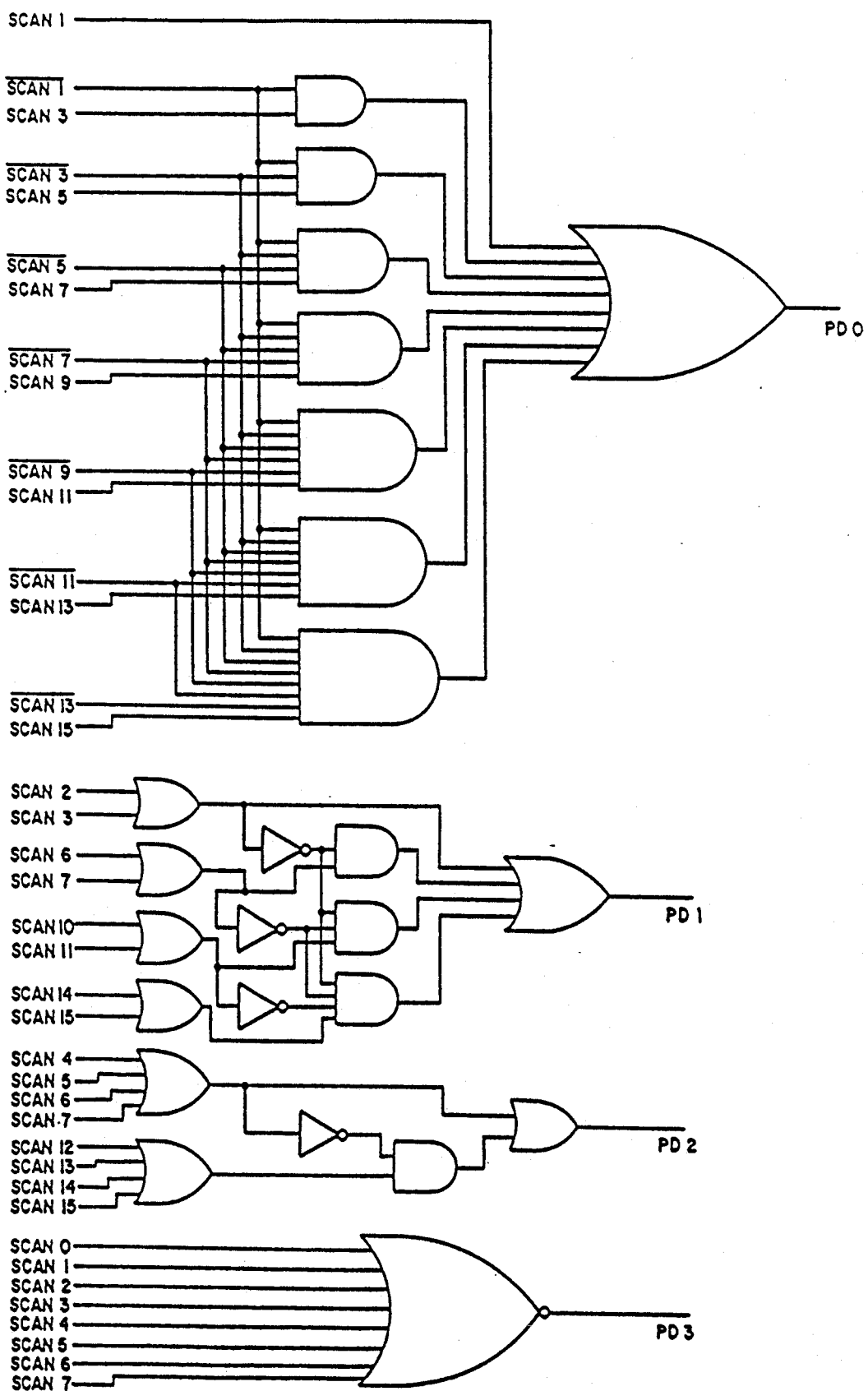
FIG. 22 to 24, when taken together, provide a logic diagram of the encoder of the present invention.
Figure 23:
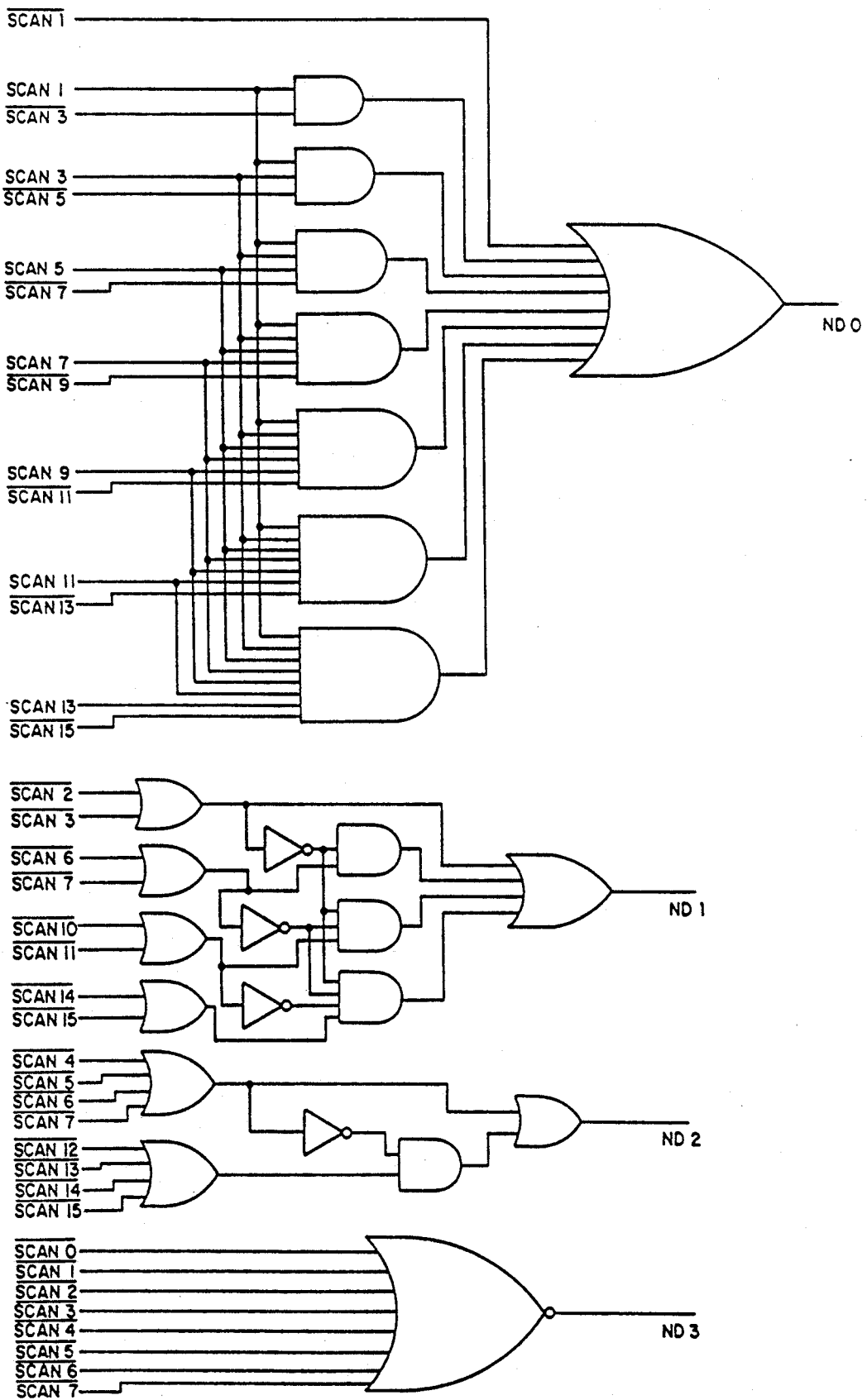
Figure 24:
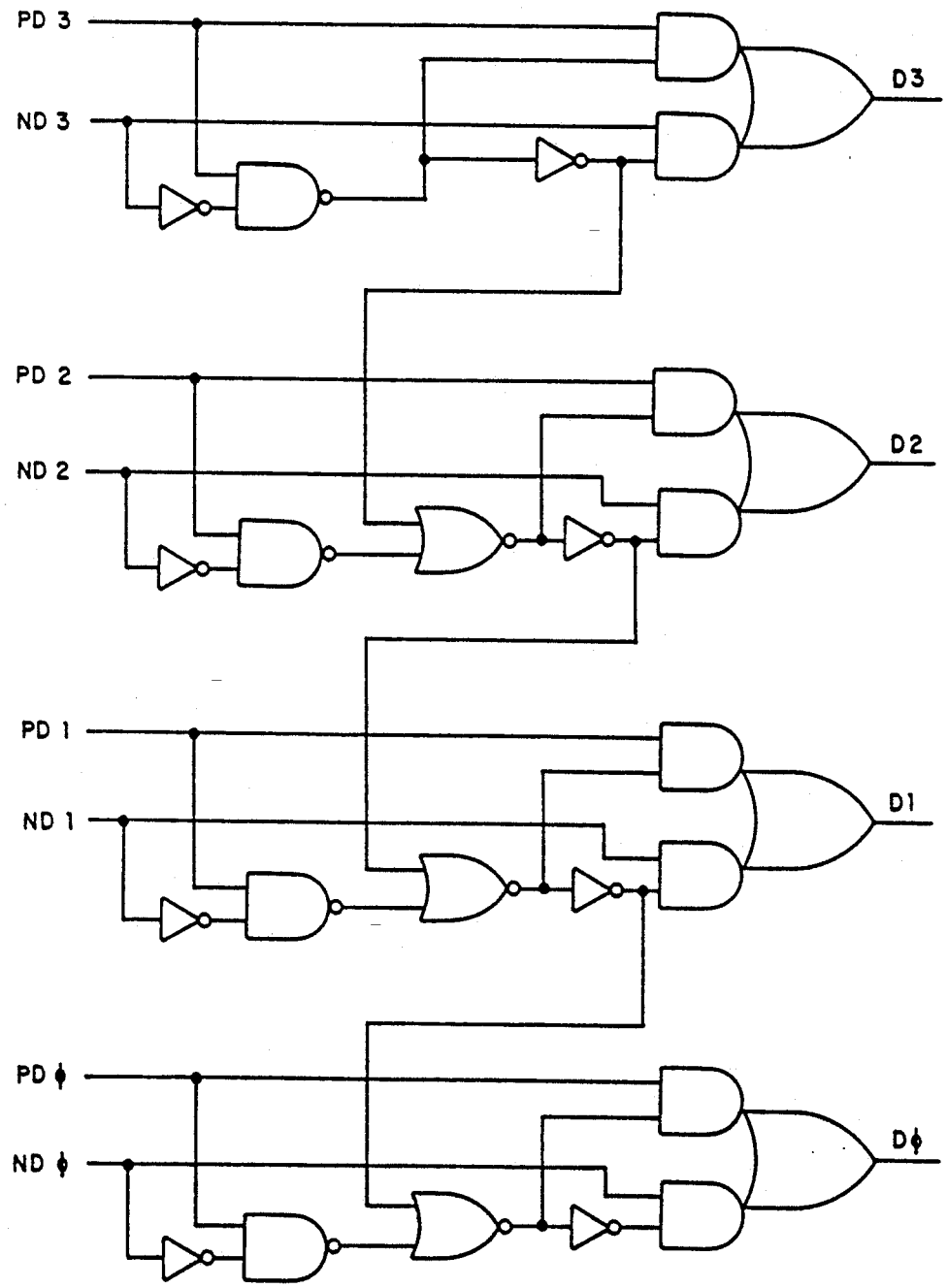

In order to be able to bypass the appropriate logic of a processor element in which a fault has been detected by the comparator in the manner previously described, it is necessary to provide an encoder which can indicate or identify the specific processor element for which a corresponding error signal has been generated. The comparator alone would not accomplish this additional function because it only indicates the occurrence of an error, but does not identify the location of a fault corresponding to such an error. Accordingly, the present invention also provides an encoder into which all of the aforementioned scan output signals are also input. The output of the encoder the logic circuit of which is shown in FIGS. 22 through 24, comprises a plurality of lines, the number of which is equal to the log to the base two of the number of processor elements in the chip. Thus for example, in the embodiment shown herein where there are 16 processor elements on each chip, there are four output lines from the encoder. These four output lines provide a binary code which reflects the specific processor element from which a scan output signal, different from the other scan output signals on the chip, has caused an error signal from the output of the comparator.

It will be observed that the logic circuits of the encoder shown in FIGS. 22 and 23 are identical, each comprising four sets of Boolean logic configurations which generate internal use intermediate output signals applied in the logic circuitry of FIG. 24. In the identical logic circuits of FIGS. 22 and 23, one such set of Boolean logic devices comprises a plurality of AND gates, as well as an ungated line, all connected to a common OR gate. Another such set of logic comprises a plurality of OR gates, the outputs of which are connected to a plurality of AND gates, which in turn have outputs connected to a common OR gate. Another such logic circuit configuration comprises a plurality of OR gates connected in a different configuration to an AND gate and an OR gate, the last such logic circuit configuration comprises a single multi-input NOR gate. The actual number of such gates in each such circuit will, of course, depend upon the number of processor elements in each chip. The configurations shown in FIGS. 22 through 24 represent the required number of gates configured for encoding four lines representing 16 different possibilities corresponding to the 16 different processor elements. The sole distinction between the circuitry of FIGS. 22 and 23 is the inputs. More specifically, for each input scan output signal applied to the circuitry of FIG. 22, the corresponding inverted scan output signal is applied as an input to the circuitry of FIG. 23.

The outputs of the circuit of FIG. 22, designated PD0 through PD3, and the outputs of the circuit of FIG. 23, designated ND0 through ND3, are applied in like-numbered pairs to the logic circuitry of FIG. 24. The logic circuitry of FIG. 24 comprises four identifiable sets of logic configurations, each such set adapted to receive a pair of the aforementioned internally generated output signals. Each such pair corresponds to one of the encoder output signals which are designated in FIG. 24 as D0 through D3. The actual logical operation of the encoder of FIGS. 22 through 24 need not be described herein in detail for each possible set of scan signal inputs because such will be readily apparent to those having skill in the Boolean logic arts. Suffice it to say that there are 16 possible four bit codes, one such code corresponding to each possible scan signal, the logic state of which may be different from the remaining scan signals, indicating the presence of an error in a logic circuit on a chip of the present invention. Accordingly, the circuit of FIGS. 22 through 24 provide a means for specifically identifying the location of a detected fault, that is the particular logic circuit of a particular processor element in which a fault has been detected by means of the present invention.

It will now be understood that what has been disclosed herein comprises a sequence information signal processing integrated circuit chip designed to perform high speed calculation based upon the dynamic programming algorithm defined by Waterman and Smith. This chip is designed to be a building block of a linear systolic array. The performance of the systolic array can be increased by connecting additional such chips to the array. Each such chip provides sixteen processor elements, a 128 word similarity table in each processor element, user definable query threshold and preload threshold and block maximum value and location calculation and buffering. The chip provides the equivalent of about 400,000 transistors or 100,000 gates. All numerical data are input in 16 bit, two's compliment format, and result in comparison scores ranging from +32,767 to −32,768. A control logic device in the chip performs the control and sequencing of the processor elements. It contains threshold logic for sequence and timing, as well as enabling counters for sequence and block counts.

The particular invention described herein comprises a unique on-chip circuit for quickly and efficiently detecting a fault in any of such processor elements and for automatically bypassing any such faulty processor element. A series of vector bits are applied serially to a plurality of scan registers, one such scan register being associated with a respective processor element. When the vector bits are all simultaneously clocked (in one cycle) through identical processor elements, any non-identical scan output signal reveals the occurrence of an error and thus a fault in a processor element. A comparator and an encoder provide on-chip logic circuits which detect such an error and identify the processor element in which a fault has occurred. A fault bypass register provides signals to a plurality of multiplexers and in response to the encoder output, the appropriate multiplexer is switched to bypass the faulty processor element. In this manner, the present invention provides a unique high-speed on-chip test capability which detects and bypasses faulty processor elements, thus assuring highly reliable systolic array performance despite the large number of transistors used therein.

Those having ordinary skill in the arts relevant to the present invention will now, as a result of applicants' teaching herein, perceive various modifications and additions which may be made to the invention. By way of example, the particular architecture designed to perform fault detection and bypass, may be altered while still providing a useful and accurate technique for efficiently detecting faults and bypassing such faults in a systolic array. Accordingly, all such modifications or additions are deemed to be within the scope of the invention which is to be limited only by the claims appended hereto.

We claim:

1. In a systolic array of identical, serially interconnected processor elements, a fault detection circuit comprising:

a plurality of scan registers, each such scan register being associated with a respective one of said processor elements for shifting a plurality of selected test bits through a processor element and for generating a scan output signal from a processor element, said scan output signal being indicative of the logic performance of said processor element;

a comparator for generating an error signal when any such scan output signal is different from the remaining such scan output signals; and an encoder for generating a plurality of encoded signals identifying the processor element for which such different scan output signal is generated.

2. The fault detection circuit recited in claim 1 further comprising:

a plurality of two parallel-input multiplexers, one such multiplexer being connected between each adjacent pair of said processor elements, one of said multiplexer parallel inputs being connected to the immediately adjacent processor element and the other of said multiplexer parallel inputs being connected to the processor element immediately preceding said immediately adjacent processor element; and means for switching each said multiplexer between said respective parallel inputs depending upon whether the scan output signal of said immediately adjacent processor element is different or identical to the remaining scan output signals.

3. The fault detection circuit recited in claim 2 wherein said switching means comprises a switching signal terminal on each said multiplexer and a register for storing a plurality of switching signals, said switching signals being applied to respective ones of said switching signal terminals, the state of each such switching signal being controlled in accordance with the plurality of encoded signals generated by said encoder.

4. The fault detection circuit recited in claim 3 wherein said switching signals are also applied to said comparator and wherein said comparator comprises means for inhibiting said error signal after the multiplexer corresponding to a scan register which has generated a different scan output signal, has been switched.

5. The fault detection circuit recited in claim 1 further comprising:

at least one, two parallel-input multiplexer connected in series with said processor elements for directing data around said processor elements in the event any of said scan registers generates said different scan output signal.

6. The fault detection circuit recited in claim 1 further comprising means for altering said test bits for fully testing the logic performance of all said processor elements.

7. A fault detection circuit for use on a unitary integrated circuit chip with a plurality of identical processor elements configured in a serial arrangement and forming a systolic array; the fault detection circuit comprising:

a plurality of scan registers, each such scan register being associated with a respective one of said processor elements for shifting a plurality of selected test bits through a processor element and for generating a scan output signal from a processor element, said scan output signal being indicative of the logic performance of said processor element;

a comparator for generating an error signal when any such scan output signal is different from the remaining such scan output signals; and an encoder for generating a plurality of encoded signals identifying the processor element for which such different scan output signal is generated.

8. The fault detection circuit recited in claim 7 further comprising:

a plurality of two parallel-input multiplexers, one such multiplexer being connected between each adjacent pair of said processor elements, one of said multiplexer parallel inputs being connected to the immediately adjacent processor element and the other of said multiplexer parallel inputs being connected to the processor element immediately preceding said immediately adjacent processor element; and means for switching each said multiplexer between said respective parallel inputs depending upon whether the scan output signal of said immediately adjacent processor element is different or identical to the remaining scan output signals.

9. The fault detection circuit recited in claim B wherein said switching means comprises a switching signal terminal on each said multiplexer and a register for storing a plurality of switching signals, said switching signals being applied to respective ones of said switching signal terminals, the state of each such switching signal being controlled in accordance with the plurality of encoded signals generated by said encoder.

10. The fault detection circuit recited in claim 9 wherein said switching signals are also applied to said comparator and wherein said comparator comprises means for inhibiting said error signal after the multiplexer corresponding to a scan register which has generated a different scan output signal, has been switched.

11. The fault detection circuit recited in claim 7 further comprising:

at least one, two parallel-input multiplexer connected in series with said processor elements for directing data around said processor elements in the event any of said scan registers generates said different scan output signal.

12. The fault detection circuit recited in claim 7 further comprising means for altering said test bits for fully testing the logic performance of all said processor elements.

* * * * *